US008347929B2

(12) United States Patent
Oba et al.

(10) Patent No.: US 8,347,929 B2
(45) Date of Patent: Jan. 8, 2013

(54) MULTI-PIECE RIM AND ITS ATTACHING/REMOVING METHOD

(75) Inventors: Kentaro Oba, Tokyo (JP); Yukio Nakamura, Tokyo (JP); Yoshiyuki Higashino, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/527,165

(22) PCT Filed: Feb. 8, 2008

(86) PCT No.: PCT/JP2008/052109
§ 371 (c)(1),
(2), (4) Date: Mar. 17, 2010

(87) PCT Pub. No.: WO2008/099775
PCT Pub. Date: Aug. 21, 2008

(65) Prior Publication Data
US 2010/0164275 A1    Jul. 1, 2010

(30) Foreign Application Priority Data

Feb. 13, 2007 (JP) ................................. 2007-031852
Feb. 7, 2008 (JP) ................................. 2008-027268

(51) Int. Cl.
*B60B 25/04* (2006.01)
(52) U.S. Cl. ........................... 152/410; 301/9.1; 152/396
(58) Field of Classification Search .................... 301/9.1,
301/10.1, 11.1, 13.1, 13.2, 36.1; 152/379.5,
152/396, 402, 403, 404, 405, 406, 407, 408,
152/409, 410; 29/894.352
See application file for complete search history.

(56) References Cited

U.S. PATENT DOCUMENTS

| 1,460,278 | A | * | 6/1923 | Roesch | 301/29.2 |
| 1,600,222 | A | * | 9/1926 | Fox | 301/23 |
| 1,836,922 | A | | 12/1931 | Helvern | |
| 1,892,127 | A | * | 12/1932 | Baker | 301/35.3 |
| 2,409,410 | A | * | 10/1946 | Zarth | 152/400 |
| 3,608,607 | A | * | 9/1971 | Gerbeth | 152/410 |
| 4,175,606 | A | * | 11/1979 | Bailey | 152/399 |
| 4,552,194 | A | | 11/1985 | Brown et al. | |
| 4,757,851 | A | | 7/1988 | Van Den Abeel | |
| 4,995,673 | A | * | 2/1991 | DuBost | 301/37.36 |
| 5,193,864 | A | * | 3/1993 | Coleman | 292/256.67 |
| 6,296,320 | B1 | | 10/2001 | Miyashita et al. | |

(Continued)

FOREIGN PATENT DOCUMENTS
JP    60-93503 U    6/1985
(Continued)

*Primary Examiner* — Kip T Kotter
(74) *Attorney, Agent, or Firm* — Smith Patent Office

(57) ABSTRACT

It is an object of the present invention to provide a multi-piece rim which does not need much labor for supporting, and does not increase the number of components to be managed and the number of needed tasks.

The present invention constructs a lock ring (40) to be fitted in the groove (11*a*) of a gutter band (11), which ring is divided in a plurality of portions (41, 42) being coupled at each end (41*a*, 42*a*) thereof by a flexible coupling member (43). Alternatively, a lock ring (140) is formed into a substantially C-shape being manufactured by cutting a part of a circular ring, and comprises a first portion (141) wherein a length of a chord at the cut portion is substantially equal to the diametral of a hub, and a second portion (142) having a shape corresponding to the cut portion of a circular ring in the first portion.

5 Claims, 16 Drawing Sheets

U.S. PATENT DOCUMENTS 6,568,764 B2    5/2003    McNeil
6,786,259 B2 *    9/2004    Vehar et al. .................. 152/410

FOREIGN PATENT DOCUMENTS

| | | | |
|---|---|---|---|
| JP | 61-1502 | A | 1/1986 |
| JP | 62-227802 | A | 10/1987 |
| JP | 2557868 | B2 | 9/1996 |
| JP | 2000-108603 | A | 4/2000 |
| JP | 2001-225604 | A | 8/2001 |
| JP | 2003-220801 | A | 8/2003 |
| JP | 3804952 | B | 8/2006 |
| SU | 962032 | A * | 9/1982 |
| WO | WO 2006106051 | A2 * | 10/2006 |

* cited by examiner

Prior Art

MULTI-PIECE RIM AND ITS ATTACHING/REMOVING METHOD

BACKGROUND OF THE INVENTION

1. Field of the Invention

The present invention relates to a multi-piece rim attached to a tire for a construction vehicle or a mining vehicle, and more particularly, for a large-size construction vehicle or mining vehicle.

2. Background Art

Tires for a large-size construction vehicle or mining vehicle are different in rigidity from tires for passenger vehicles, and there are many cases that tires for a large-size construction vehicle or mining vehicle cannot be fitted to single-piece rims. For this reason, multi-piece rims are often used for tires for a large-size construction vehicle or mining vehicle.

The construction of such a multi-piece rim is shown in FIG. 14.

In FIG. 14, a multi-piece rim 100J has a rim base 1, left and right side rings 2, a bead seat band 3, and a lock ring 4.

A range near an end of the rim base 1 where the lock ring 4 is located (right end in FIG. 14) is a so-called gutter band 11. A back flange 12 is formed at the left end of the rim base 1.

In FIG. 14, the construction for attaching the multi-piece rim to the construction vehicle or mining vehicle side (hub) is not shown.

In FIG. 14, air is pumped into the tire and as the air pressure in the tire become higher, the tire inflates toward the directions indicated by arrows Y (both left and right in FIG. 14) and both the left and right side rings 2 and the bead seat band 3 move toward the directions indicated by the arrows Y.

The lock ring 4 is fitted in a groove 11a formed in the gutter band 11 and the gutter band 11 is integral with the rim base 1. Therefore, the lock ring 4 restrains the side rings 2 and bead seat band 3 from moving in a left direction in FIG. 14.

As shown in FIG. 15, the lock ring 4 has elasticity, particularly an elastic repulsive force which acts to contract the inside diameter of the lock ring 4 in the direction indicated by an arrow R in FIG. 15 (inwardly in the radial direction) to the extent that it becomes equal to, or smaller than, the diameter of the groove bottom of the gutter band groove 11a, and the lock ring 4 has one cut 4s.

If the lock ring 4 does not have an elastic repulsive force which acts to contract inwardly in the radial direction (a direction indicated by arrows R in FIG. 15), the lock ring 4 will be able to slip out of the groove 11a formed in the gutter band 11. By the elastic repulsive force contracting lock ring 4 acting inwardly in the radial direction (the direction indicated by arrow R in FIG. 15), the lock ring 4 is fitted and held in the gutter band groove 11a.

In some large-size construction vehicles or mining vehicles, each rear wheel uses a tire assembly which is referred to as a "double tire".

FIG. 16 shows an example of a "double tire" which is a construction having a tire and a rim on each of the inner and outer sides.

In FIG. 16, the lock rings 4, which are provided on the inner side (machine and/or vehicle body side, a left side in FIG. 16) and outer side (opposite of the machine body side, a right side in FIG. 16) respectively, are so arranged so that they face each other in between the inner and outer tires. This construction intends to ensure that if one of the lock rings 4 should come off, the tire 6 in which the lock ring 4 has come off is moved so as to let it abut on the other tire 6 in order to prevent the tires 6 and various components of the multi-piece rims from coming off the machine body (such as on a construction vehicle and/or mining vehicle).

In a large-size construction vehicle or mining vehicle, tire rotation is carried out frequently so that the tires 6 wear uniformly and the service life of the tires 6 is extended. If a tire is punctured, the tire 6 must be removed for repair.

For this reason, the frequency of the removal of the tire 6 is higher in a large-size construction vehicle or mining vehicle. In the case of a double tire, it is possible that both the outer tire 6 and the inner tire 6 have to be removed from the machine body.

In case both tires 6 should be removed, in the case of a multi-piece rim 100J in the prior art shown in FIG. 16, it is necessary for removal of the inner tire 6 to remove the outer tire 6 and outer multi-piece rim 100J from the machine body.

The multi-piece rim 100J shown in FIG. 16 has the back flange 12 outside the outer rim base (right side in FIG. 16). Therefore, in case that the outer tire 6 should be removed from the rim base 1, first the radial inner edge of the tire 6 is interfered with by the side ring 2, and then, the side ring 2 is interfered with by the back flange 12 or a radial projection (a lip, not shown in the figure) at an end of said back flange.

Therefore, in the case shown in FIG. 16, it is impossible to remove only the outer tire 6 toward the outer side (a right side in FIG. 16) of the rim base 1.

Also, in case that there are the back flange 12 and lip thereof (not shown) in the outer multi-piece rim 100J, even if the inner tire 6 should be removed, said inner tire is interfered with by the back flange 12 and lip thereof (not shown) and cannot be removed from the machine body.

In the prior art shown in FIG. 16, in order to remove the outer multi-piece rim and tire from the machine body, it is necessary to remove bolts B1 from the hub 5, and to remove the outer tire 6, the rim base 1 and a fitting member 7 (member for fitting the rim base 1 to the hub) from the hub 5 in a state that the outer tire 6, the rim base 1 and a fitting member 7 are combined.

However, for example, the number of bolts B1 is 50-70. Although there are cases that the number of bolts B1 is smaller than that example, considerable labor is required to remove a relatively large number of bolts B1 (in some cases, a great many bolts B1 should be removed).

A technique shown in FIG. 17 has been proposed, in order to solve the problem in the prior art shown in FIG. 16, that is, the outer multi-piece rim must be removed from the machine body for removing the inner or outer tire 6.

In FIG. 17, one multi-piece rim 100 (outer multi-piece rim) includes two side rings 2, two gutter bands 11, two bead seat bands 3, and two lock rings 4. Therefore, in the prior art shown in FIG. 17, there is no back flange 12 which is shown in FIG. 16 on the outer side.

Therefore, the inner tire 6 and outer tire 6 can be pulled out toward the direction indicated by an arrow Y in FIG. 17 in a state that the rim base 1 is fitted to the hub 5, without removing the rim base 1 of the multi-piece rim 100 from the machine body.

However, in the multi-piece rim 100 shown in FIG. 17, in a case that the lock ring 4 of the prior art as shown in FIG. 15 is applied, when attaching the lock ring 4 to the outer multi-piece rim or inner multi-piece rim, the lock ring 4 must be passed through the rim base 1 of the outer multi-piece rim 100 and be fitted into the groove 11a of the gutter band 11, while the radial dimension (a dimension in the direction indicated by R in FIG. 15) of the lock ring 4 is held large against the elastic repulsive force (the elastic repulsive force which contracts the ring toward the direction indicated by arrow R).

For example, there are cases that the mass of the lock ring 4 is 50 kg or so, it would be very difficult and require a great deal of labor to place such a heavy lock ring 4 in a prescribed position while holding it against the elastic repulsive force which contracts said lock ring inwardly in the radial direction.

On the other hand, instead of the one-piece lock ring shown in FIG. 15, a two-piece lock ring has also been proposed.

In the prior art in which a two-piece lock ring is used, after such a lock ring (a lock ring being divided in two portions) is fitted into the groove 11a (FIG. 14) of the gutter band 11 and held in the so-called "locked" state, where both ends of the half portions are coupled (fastened) by means of fasteners such as screws and plates.

By such construction in which both ends of the half lock ring portions are coupled by fasteners, the lock ring is securely fitted in the groove 11a (FIG. 14) of the gutter band 11, and therefore, the elastic repulsive force, which contracts the lock ring inwardly in the radial direction, is not necessary.

However, in the two-piece lock ring of the prior art, there are following problems.

First, in a process for coupling the lock ring, each half portion of the lock ring must be securely fitted in the groove 11a of the gutter band (such that the half portions must be in a "locked" state).

Because, in case that the half portions of the lock ring are coupled by means of fasteners in a state that said portions are not properly fitted in the groove of the gutter band (see 11a in FIG. 14), it is difficult to combine the multi-piece rim 100 with the tire 6 accurately (to combine the multi-piece rim 100 with the tire 6 is a so-called "assembly").

Second, if the tire diameter is large, the lock ring mass must be correspondingly large. Therefore, a large amount of labor is required to support the lock ring so as to securely fit each half portion of the lock ring in the groove of the gutter band (see 11a in FIG. 14).

Specifically, in some cases, two or more workers are needed and a machine for supporting each half portion of the lock ring must be prepared.

Third, if the lock ring is divided in two portions, the number of components to be managed (components under management) should be increased.

Fourth, since the lock ring is divided in two portions, coupling work (fastening work) has to be carry out at two points for one lock ring. Thus the number of needed tasks is increased.

As another prior art, a multi-piece rim disk wheel has been proposed in which a rim base is joined with a gutter band, first and second center bands, a disk and a back flange by complete penetration butt-welding to cope with an increase in payload (see Patent Document 1).

Such a prior art reference is useful but does not solve the problem caused by applying a two-piece lock ring as mentioned above.

Patent Document 1:
Japanese non-examined Patent Publication No. 2000-108603

DISCLOSURE OF THE INVENTION

Problem to be Solved by the Invention

The present invention has been proposed in view of the problems in the above-mentioned prior art references and has an object to provide a multi-piece rim having a lock ring in which the lock ring is divided into a plurality of portions (for example, two portions) and each portion of the lock ring can be securely fitted in a gutter band groove, and even if the mass of the lock ring is large, a large amount of labor is not required to support it and the number of components to be managed and the numbers of needed tasks will not increase. The present invention also provides a method for installing the lock ring in the multi-piece rim and a method for removing the lock ring from the multi-piece rim.

Means for Solving the Problem

A multi-piece rim (100J, 100) according to the present invention comprises a rim base (1) with gutter bands (11) at ends (inner end and/or outer end) thereof, lock rings (40) (as the same number of gutter bands 11) to be fitted in grooves (11a) formed in the respective gutter bands, bead seat bands (3) positioned at the ends (inner end and/or outer end), and side rings (2) positioned at an inner end and an outer end, wherein the lock ring (40) is divided into a plurality of portions (for example, two) (41, 42) in a circumferential direction, and that the portions (41, 42) are coupled at each end (41a, 42a) thereof by means of a flexible coupling member (for example, wire 43).

In this specification, the phrases "rim," "multi-piece rim" or "rim base" are also used for a wheel having a disk.

It is possible to construct the outer lock ring of the outer multi-piece rim (lock ring 4A in FIG. 17) so as not to be divided.

Also, a method for assembling a multi-piece rim (100J, 100) according to the present invention wherein there are steps for:

fitting an uncoupled end (41b) of a lock ring (40) into a gutter band groove (11a), which ring is divided into a plurality of portions (41, 42) (for example, divided in two portions), and the portions of which ring are coupled at each end (41a, 42a) thereof by means of a flexible coupling member (for example, wire 9) (FIGS. 3 and 4), moving the lock ring (40) along the gutter band groove (11a), so that a joint (point A indicated by arrow A in FIG. 5) of the portions (41, 42) of the lock ring (40) being divided in a plurality of portions, on which joint portions are coupled by means of a coupling member (43), is positioned on an upper position in a vertical direction (a direction indicated by an arrow UD in FIG. 5) and that uncoupled ends (see an arrow B in FIG. 5) are positioned on a lower position in the vertical direction (FIGS. 5 and 6), and coupling uncoupled ends (41b, 42b) of the portions (41, 42) of the lock ring (40) which is divided in a plurality of portions each other (FIG. 7).

A method for removing the lock ring (40) from the above-mentioned multi-piece rim of the present invention wherein there are steps for:

uncoupling the ends (41b, 42b) of portions (41, 42) of the lock ring being divided in a plurality of portions (for example, divided in two portions), which ends are not coupled by a coupling member (43) in advance (reversing process to a procedure shown in FIG. 7), and moving the lock ring (41, 42) along a gutter band groove (11a) (by pulling or pushing) while holding one end (42b or 41b) of the uncoupled ends (FIGS. 3 and 4).

After carrying out the removing method, the side rings (2) and bead seat bands (3) are removed, and the outer tire (6) and inner tire (6) are pulled out away from the machine body (toward the direction indicated by an arrow Y in FIG. 17).

A multi-piece rim (200) according to the present invention comprises a rim base (1) being provided with gutter bands (11) at ends (inner end and/or outer end) thereof, lock rings (as many as gutter bands 11) (140) to be fitted in grooves (11a) formed in the respective gutter bands, bead seat bands (3) positioned at the ends (inner end and/or outer end), and side rings (2) positioned at an inner end and an outer end, wherein the lock ring (140) is divided in a circumferential direction to a first portion (141) and a second portion (142) which are different in length, the first portion (141) is formed into a substantially C shape like a circular ring with a cut portion, the second portion (142) has a shape corresponding to the cut portion of the circular ring of the first portion (141), and that (both) ends of the first portion (141) are coupled with (both) ends of the second portion (142) by means of coupling members (for example, plate 8).

In the multi-piece rim, a chord length of the cut portion of the first portion (141) of the lock ring (140), which is divided in a circumferential direction, is substantially equal to a diameter of a hub (to which the multi-piece rim 200 is attached).

Here, the chord length of the cut portion of the first portion (141) need not be completely equal to the diameter of the hub (to which the multi-piece rim 200 is attached), but may be slightly different.

Furthermore, in the multi-piece rim it is preferable that the first portion (141) and the second portion (142) of the lock ring (140), which is divided in a circumferential direction, are coupled to each end thereof by means of a flexible coupling member.

A method for assembling a multi-piece rim according to the present invention, where the rim includes a lock ring (140) having a first portion (141) formed into a substantially C shape being similar to a circular ring with a cut portion that has a chord length substantially equal to a diameter of a hub (to which the multi-piece rim 200 is attached) and a second portion (142) with a shape corresponding to the cut portion of the circular ring of the first portion (141), includes the steps of:

moving the first portion (141) so as to pass the cut portion beyond the hub (to which the multi-piece rim 200 is attached) so that the first portion (141) is positioned on an outer periphery of the hub (FIGS. 20 and 21);

expanding the first portion (141) positioned on the outer periphery of the hub, so that the first portion (141) passes beyond a gutter band and fits in a groove (11a) of the gutter band (FIGS. 22 and 23);

placing the second portion (142) to the cut portion of the first portion (141) (FIG. 24); and coupling (both) ends of the first portion (141) with (both) ends of the second portion (142) by coupling members (for example, plate 8) (FIG. 24).

A method for removing the lock ring (140) from the multi-piece rim according to the present invention, which rim includes the lock ring (140) having a first portion (141) formed into a substantially C shape being similar to a circular ring with a cut portion which has chord length substantially equal to the diameter of a hub (to which the multi-piece rim 200 is attached) and a second portion (142) with a shape corresponding to the cut portion of the circular ring of the first portion (141), includes the steps of:

removing a coupling member (for example, plate 8) from (both) ends of the first portion (141) and (both) ends of second portion (142) (reversing the procedure shown in FIG. 24);

removing the second portion (142);

expanding the first portion (141) so as to move the first portion (141) toward an outer periphery of the hub beyond a gutter band (reversing the procedure shown in FIGS. 23 and 22); and removing the first portion (141) positioned on the outer periphery of the hub (to which the multi-piece rim 200 is attached) in a manner that the cut portion passes the hub (reversing the procedure shown in FIGS. 21 and 20).

After carrying out the removing method, the side rings (2) and bead seat bands (3) are removed and the outer tire (6) and inner tire (6) are pulled out away from the machine body (toward a direction indicated by an arrow Y in FIG. 17).

Additionally, in the multi-piece rim according to the present invention, it is preferable that the coupling member (for example, plate 80) has a bolt (B2), the bolt (B2) is screwed in a bolt hole (81) pierced in a lateral face of each portion (141, 142) of the lock ring (140B, 140C), and that a collar (300) is disposed in a boundary area between the coupling member (8) with the bolt (B2) and the lock ring (140B, 140C).

In this case, it is preferable that the collar (300) and/or the coupling member (80) have a covering member (400) (for example, rubber) which covers thereto.

The above-mentioned inventions are applicable to a wheel with a disk and to a rim without a disk.

Effect of the Invention

According to the present invention having the above mentioned constructions, by coupling each end (41a, 42a) of the portions (41, 42) of the lock ring (40) divided in a plurality of portions (for example, divided in two portions) by means of a coupling member (for example, wire 43), by putting the ends (41b, 42b) which are not coupled by means of a coupling member (for example, wire 43) in the gutter band groove (11a), and by pushing them therein, the whole of the lock ring (40) being divided in a plurality of portions is securely fitted in the gutter band groove (11a) and held in the so-called "locked" state.

Therefore, when the ends (41b, 42b) that are not coupled with the coupling member (43), are coupled (for example, by means of the plate 8 and bolt B2), the tire (6) and multi-piece rim (100) are accurately assembled.

In case that the lock ring (40) being divided in a plurality of portions (for example, divided in two portions) is fitted in a part of the gutter band groove (11a) (as illustrated in FIGS. 3 and 4), the rim base (1) supports the mass of the lock ring (40). For this reason, although the tire diameter is large and the mass of the lock ring (40) is heavy, a large amount of labor is not required to support the lock ring (40) and a special machine does not need to be prepared.

Furthermore, by coupling each end (41a, 42a) of the portions of the lock ring (40) divided in a plurality of portions (for example, divided in two portions) by means of a coupling member (for example, wire 43), the portions of the lock ring (40) divided in a plurality of portions (for example, divided in two portions) can be treated as a single member. Therefore, the number of components to be managed can be reduced.

Furthermore, although the lock ring (40) is divided into a plurality of portions (for example, two portions), fastening work or unfastening work is needed only at one area for one lock ring (40) (see FIGS. 3 to 7). Therefore, it is not necessary to increase a number of tasks being needed to attach and/or to remove the tire (6).

In addition, the lock ring (40) is divided in a plurality of portions (for example, divided in two portions) can be removed easily and properly from the rim base (1).

Here, in a case that a two-piece type lock ring in the prior art (a lock ring which is equally divided), since a circumference length of each portion of the lock ring (41, 42) is not more than one half of the circumference length of the lock ring, even if each portion has an elastic repulsive force which contracts itself to an inward direction in the radial direction, if couplings are not carried out in points designated by symbols A and B in FIG. 29 after the portions are fitted in the gutter band groove in the manner of a so-called "locked" state, a portion of a lock ring in the prior art, which portion is positioned in a lower range in FIG. 29, will fall out.

Also, in the prior art shown in FIG. 29, when portions are coupled couplings at points A and B, it is necessary to confirm (to check visually) that each portion is securely locked in the gutter band groove; however, as illustrated in FIG. 29, it is impossible for a skilled in the art to check points A and B visually at the same time.

Therefore, it is necessary that at least one worker stands near each of the points A and B, and that the workers simultaneously confirm at the points A and B whether the portions are properly locked and coupled. This is because if one worker confirms and couples portions at the point A and then the same worker moves to point B to confirm and couple portions, the locked state of the portions at point B may change while the worker is working at the point A.

As illustrated in FIG. 30, if half portions being divided in an equal length are arranged so as to position coupling parts of the portions in a vertical line, it may be possible that visual confirmation process and couplings process as mentioned above can be carried out either on the left or right side in FIG. 30.

However, as described above, since a circumference length of each portion of the lock ring (41, 42) is not more than one half of the circumference length of such the lock ring, even if each portion has an elastic repulsive force which contracts itself to an inward direction in the radial direction, in a state shown in FIG. 30, it is possible that a portion which is positioned in a lower range in a vertical direction will fall. Also, since a wheel to which a multi-piece rim is applied is very large, it is difficult for a worker to check visually the joint part in an upper position if the lock ring is arranged as shown in FIG. 30.

According to the present invention having the above-mentioned constructions, since the first portion (141) of the lock ring (140) is formed into a substantially C shape being like as a circular ring with a cut portion, in case that the first portion (141) is fitted in the gutter band groove (11*a*), the first portion (141) of the lock ring (140) has an elastic repulsive force which acts to contract an inside diameter thereof inwardly in a radial direction (for example, until the inside diameter of the first portion 141 is almost equal to the diameter of the gutter band groove 11*a*), and also, since the first portion (141) of the lock ring (140) is longer than one half of the circumference of the rim base, a force which acts to lock the first portion (141) of the lock ring (140) in the gutter band is exerted.

Therefore, different from the two-piece type lock ring being divided equally in the prior art, even in a state before the first portion (141) and the second portion (142) are coupled, the first portion (141) is securely locked to and held in the gutter band groove (11*a*) by the above-mentioned elastic repulsive force.

Since the first portion (141) is formed in a substantially C shape being like as a circular ring with a cut portion and a chord length of the cut portion (opening portion) is larger than a chord length of a cut portion in an one-piece lock ring in the prior art and the circumferential length is shorter than a circumferential length of an one-piece lock ring in the prior art, an amount of expansion of the cut portion which is required to fit the first portion (141) in the gutter band groove (11*a*) is smaller, and since both ends of the first portion (141) are apart from each other, it is easier to fit the first portion (141) in the gutter band groove (11*a*) by means of a tool such as a claw bar.

In addition, the first portion (141) formed into a substantially C shape being like a circular ring with a cut portion can be fitted in the gutter band groove (11*a*) even if the elastic repulsive force being generated in the radial direction (the elastic repulsive force which acts to contract the first portion 141 in the radial direction) is relatively weak. Likely, the first portion (141) can be attached in the gutter band groove (11*a*) even if a curvature radius of the first portion (141) is larger than a curvature radius of the gutter band (11*a*). Furthermore, there are some cases that a force required to expand the cut portion against the above-mentioned elastic repulsive force is smaller than in the case of a one-piece type lock ring in the prior art, and that a force required to fit the first portion (141) in the gutter band groove (11*a*) is smaller. For these reasons, according to the present invention, the first portion (141) can be easily fitted in the gutter band groove (11*a*).

Moreover, since the first portion (141) is formed into a substantially C shape being like a circular ring with a cut portion, the points where the first portion (141) and second portion (142) are coupled are either on the left or right side of the hub (in the case shown in FIG. 18, the coupling points are only on the left side).

Therefore, in the two points at which the first portion (141) and second portion (142) are coupled, one worker can visually confirm whether the first portion (141) is securely fitted in the gutter band groove (11*a*), at the same time.

Then, the worker can carry out coupling process at the two points without moving to the opposite side of the hub (opposite side in FIG. 18).

BEST MODE FOR CARRYING OUT THE INVENTION

Next, embodiments of the present invention will be described referring to the accompanying drawings.

FIGS. 1 to 7 show a first embodiment of the present invention.

Figure 17:
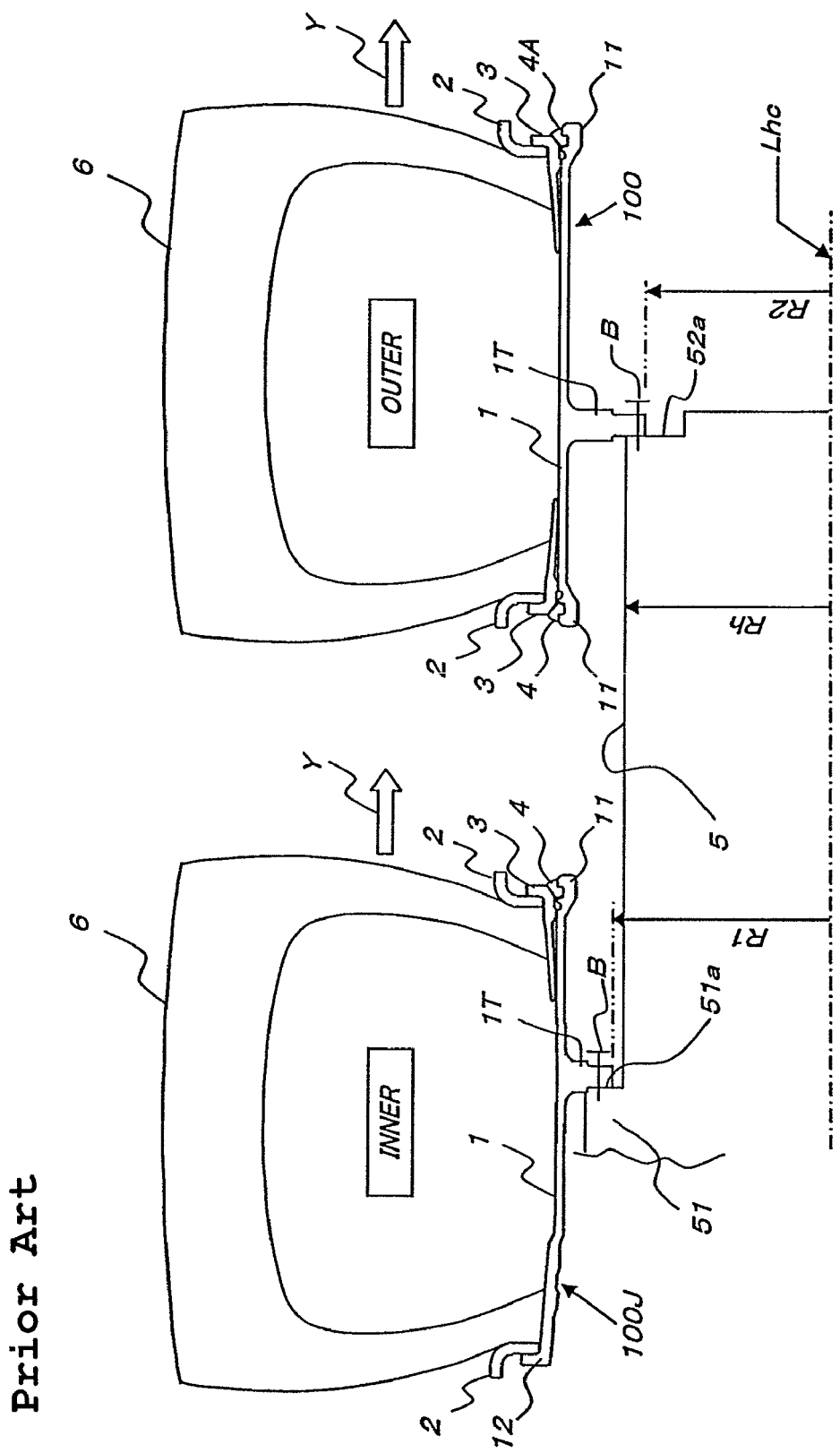
FIG. 17 is a sectional view showing the construction of a double tire different from the one shown in FIG. 16.

The multi-piece rim according to the first embodiment of the present invention has the same construction as the multi-piece rim shown in FIG. 17 except the lock ring construction. For this reason, the multi-piece rim according to the first embodiment will be first described referring to FIG. 17.

As illustrated in FIG. 17, the multi-piece rim according to the first embodiment is in the form of the so-called "double tire" in which multi-piece rims are installed on the inner and outer side of the hub of the machine body.

FIG. 17 shows an example of a rear wheel on the right side of a large-size construction vehicle or mining vehicle having double tires for rear wheels, as seen from behind the machine body.

In FIG. 17, a flange 51 is formed on the left of a hub 5. The left (inner) multi-piece rim 100J of the double tire is fitted to the flange 51 of the hub 5 with a bolt B.

Specifically, the hub fitting part 1T of the inner multi-piece rim 100J (left in FIG. 17) abuts on the vertical fitting surface 51a of the flange 51 and the bolt B is used for fitting.

In the double tire, the outer multi-piece rim 100 (right in FIG. 17) is fitted to an outer end face 52a of the hub 5. Specifically, the hub fitting part 1T of the outer multi-piece rim 100 abuts on the end face 52a of the hub 5 and a bolt B is used for fitting.

Here, the inside diameter R2 of the hub fitting part 1T of the outer multi-piece rim 100 is smaller than an inside diameter R1 of the hub fitting part 1T of the inner multi-piece rim 100J. The reason is as follows.

First, when the inner tire is pulled out to the right of the hub 5, the outside diameter Rh of the hub 5 must be smaller than the inside diameter R1 of the hub fitting part 1T of the multi-piece rim 100J. The inside diameter R2 of the hub fitting part 1T of the outer multi-piece rim 100 is smaller than the outside diameter Rh of the hub 5. Therefore, the inside diameter R2 of the hub fitting part 1T of the outer multi-piece rim 100 is smaller than the inside diameter R1 of the hub fitting part 1T of the inner multi-piece rim 100J.

In FIG. 17, the alternate long and short dash line Lhc represents the centerline of the hub 5.

Figure 14:
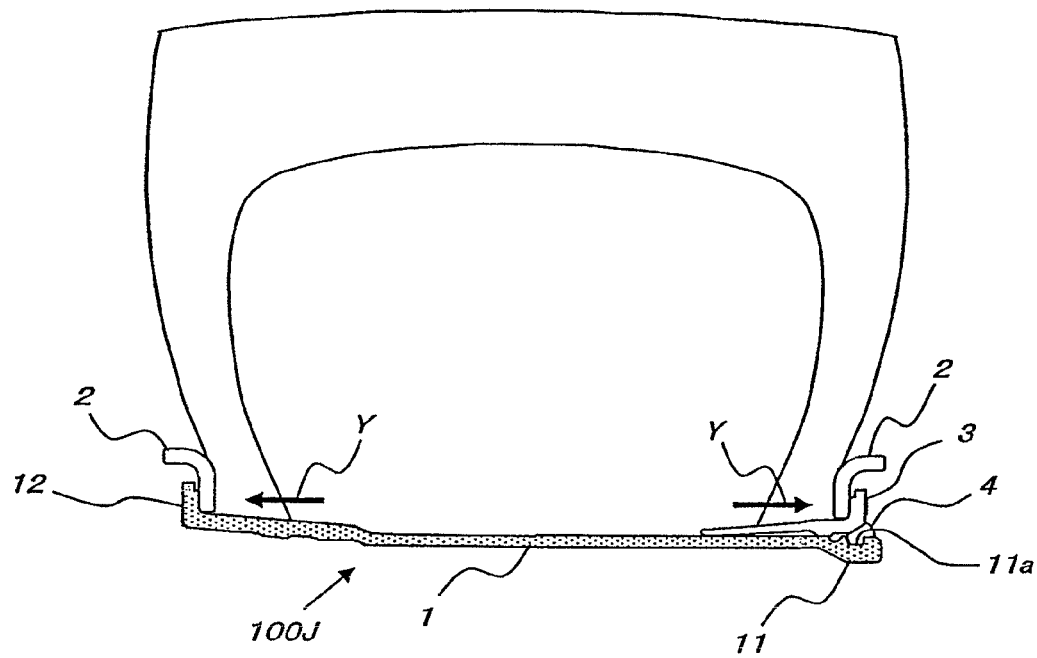
FIG. 14 is a sectional view of a multi-piece rim in the related art.
Figure 15:
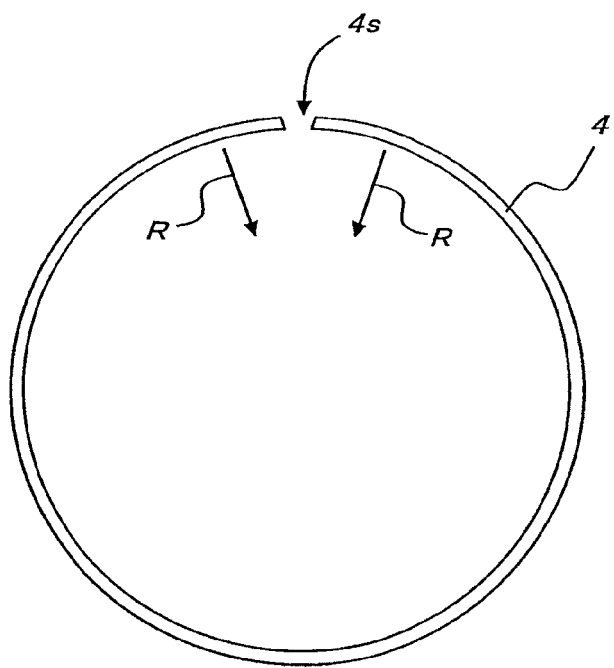
FIG. 15 is a view showing the lock ring shown in FIG. 14.
Figure 16:
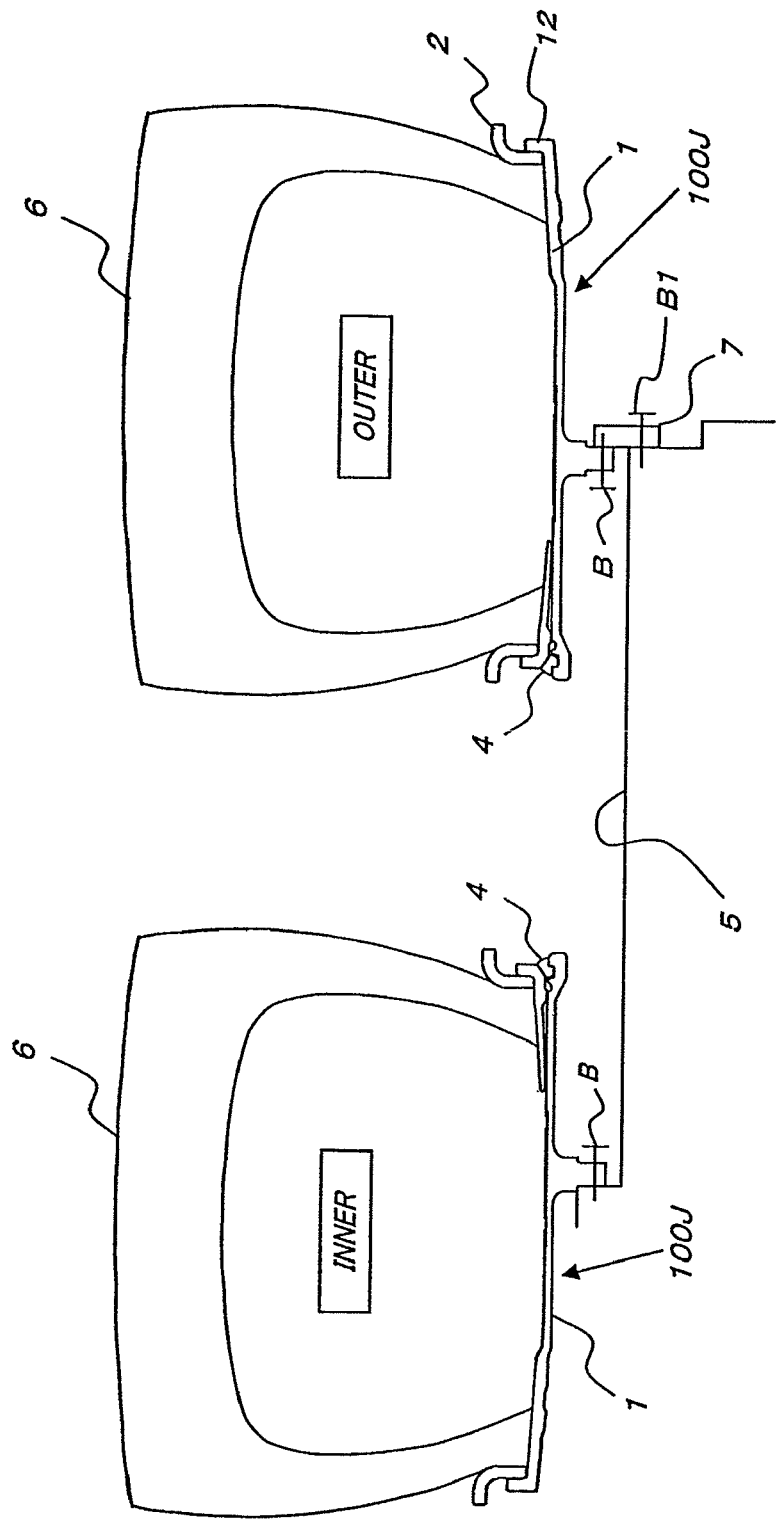
FIG. 16 is a sectional view showing the construction of a double tire in the related art.

The inner multi-piece rim 100J has the same construction as in the prior art shown in FIG. 14. The multi-piece rim 100J has a rim base 1, left and right side rings 2 and a bead seat band 3 and a lock ring 4.

The range near the end (right end) of the rim base 1 where the lock ring 4 is provided constitutes a gutter band 11 and a groove for the lock ring 4 to fit in is formed. A back flange 12 is formed at the left end of the rim base 1.

The hub fitting part 1T shown in FIG. 17 is not shown in FIG. 14.

On the other hand, the outer multi-piece rim 100 has a rim base 1 and has two side rings 2, two gutter bands 11, two bead seat bands 3, and two lock rings 4 at both the left and right ends. The outer multi-piece rim 100 has no back flange 12.

Therefore, in FIG. 17, the inner tire 6, outer tire 6, and the components of the multi-piece rims 100J and 100 can be pulled out toward the direction indicated by arrow Y in FIG. 17, without removing the rim base 1 of the multi-piece rim 100 from the machine body or with the rim base 1 fitted to the hub 5.

In FIG. 17, the inner and outer lock rings 4 have the same construction. These lock rings 4 in the first embodiment are different from those in the multi-piece rims of the prior art.

Details of these lock rings will be described referring to FIG. 1 and subsequent drawings.

In FIG. 17, the outer lock ring in the outer multi-piece rim is designated by reference symbol 4A. This lock ring 4A may not be of the two-piece type which will be described referring to FIG. 1 and subsequent drawings.

Figure 1:
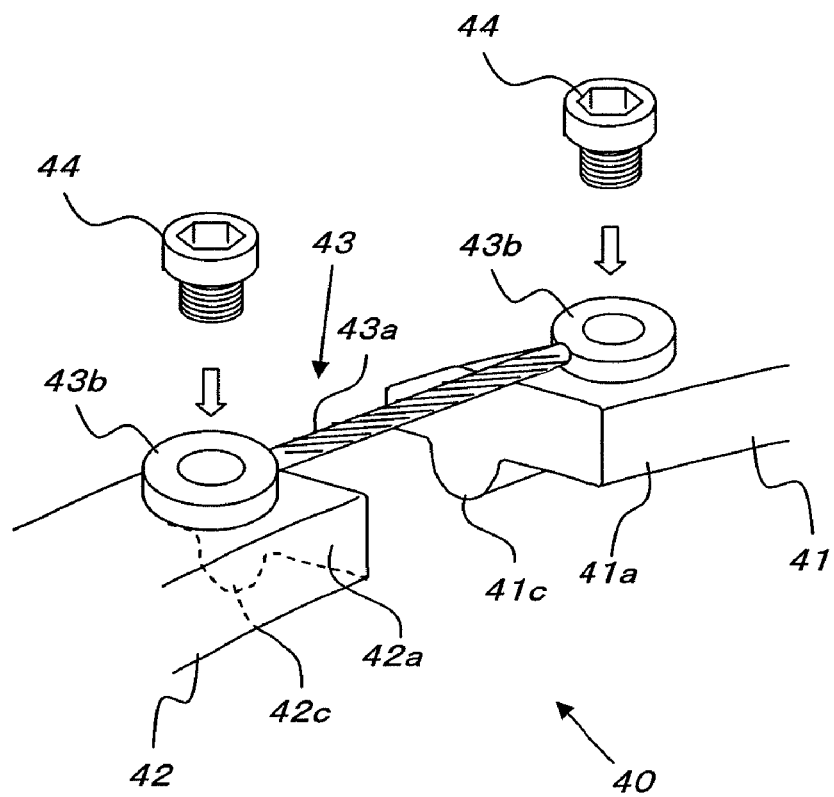
FIG. 1 is a perspective view of the main part of a first embodiment of the present invention.

FIG. 1 shows the main part of the first embodiment (joint in the two-piece lock ring). In the first embodiment, a wire 43 is used as a coupling member for coupling of the two-piece lock ring 40.

FIG. 1 shows a range near the ends 41a and 42a which are coupled by the wire 43, in one of the two joints of the two members 41 and 42 of the two-piece lock ring 40.

The ends opposite to the ends 41a and 42a coupled by the wire 43 and a range near thereof will be described referring to FIGS. 5 to 7.

In FIG. 1, the lock ring 40 is comprised of two members 41 and 42 as substantially semicircular half portions of one ring, the wire 43, and fixing bolts 44 for fixing the wire 43 on the two members 41 and 42.

The wire 43 is comprised of a wire body 43a and ring members 43b fixed at both ends of the wire body 43a (for example, washers).

The circular arc projections designated by 41c and 42c in FIG. 1 are projections to fit in the groove 11a formed in the gutter band 11 of the rim base 1.

Figure 2:
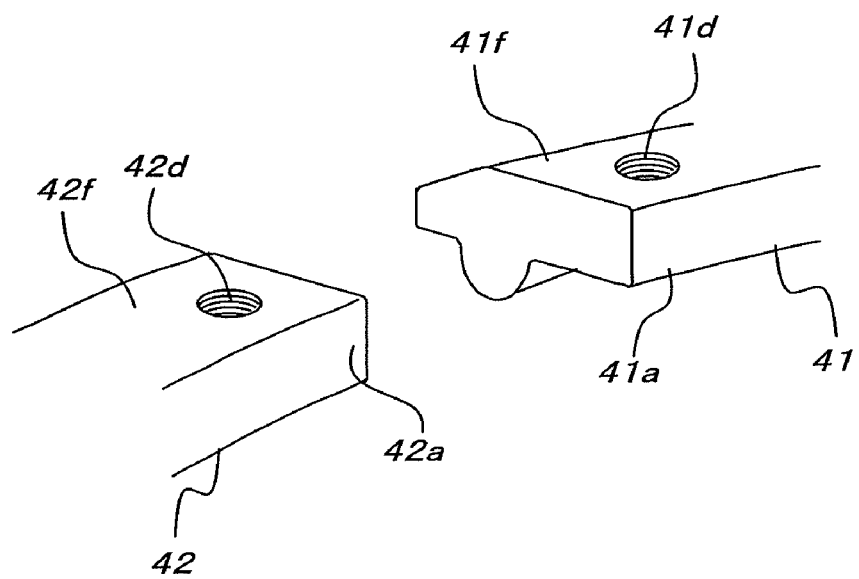
FIG. 2 is a view showing that a wire is removed from what is shown in FIG. 1.

FIG. 2 shows that the wire 43 is removed from what is shown in FIG. 1.

Internally threaded screw holes 41*d* and 42*d* in which the fixing bolts 44 (FIG. 1) are screwed are formed in the outer peripheral surfaces 41*f* and 42*f* of the opposing ends 41*a* and 42*a* of the two members 41 and 42.

In the example illustrated here, the lock ring 40 is divided into two portions but the number of such portions is not limited to two. It may be divided into three portions.

In FIG. 1, a tensile force is exerted on the wire 43 which couples the portions 41 and 42 of the two-piece lock ring 40. Hence the cross-sectional area (or strength) of the wire 43 should be enough to withstand such tensile force. For example, the wire 43 can withstand a tensile force of 2 kN.

How the lock ring 40 described in reference to FIGS. 1 and 2 is fitted in the gutter band groove 11*a* will be described referring to FIGS. 3 to 7.

Figure 3:
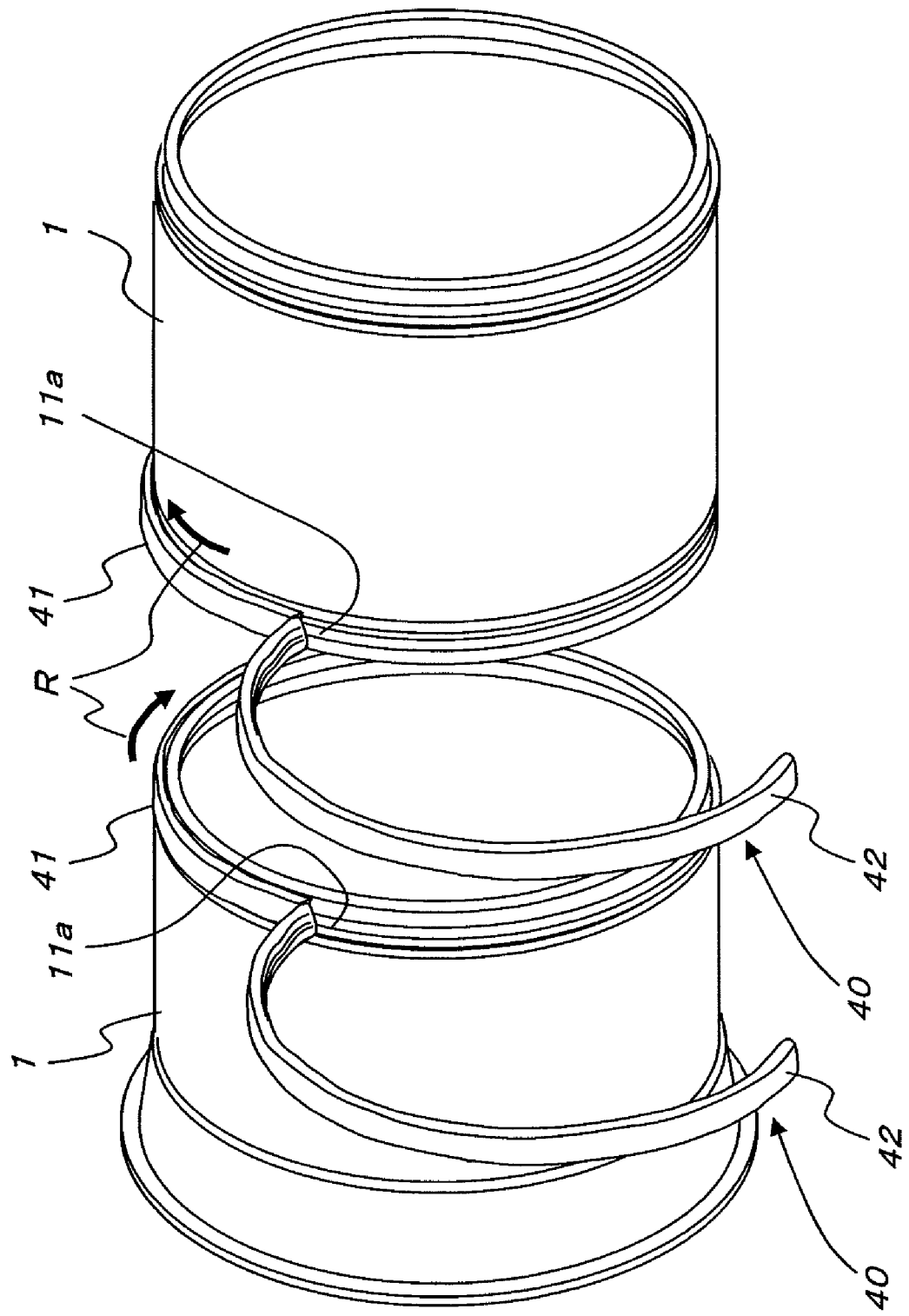
FIG. 3 is a view showing the initial stage in attachment of a lock ring in the first embodiment.
Figure 4:
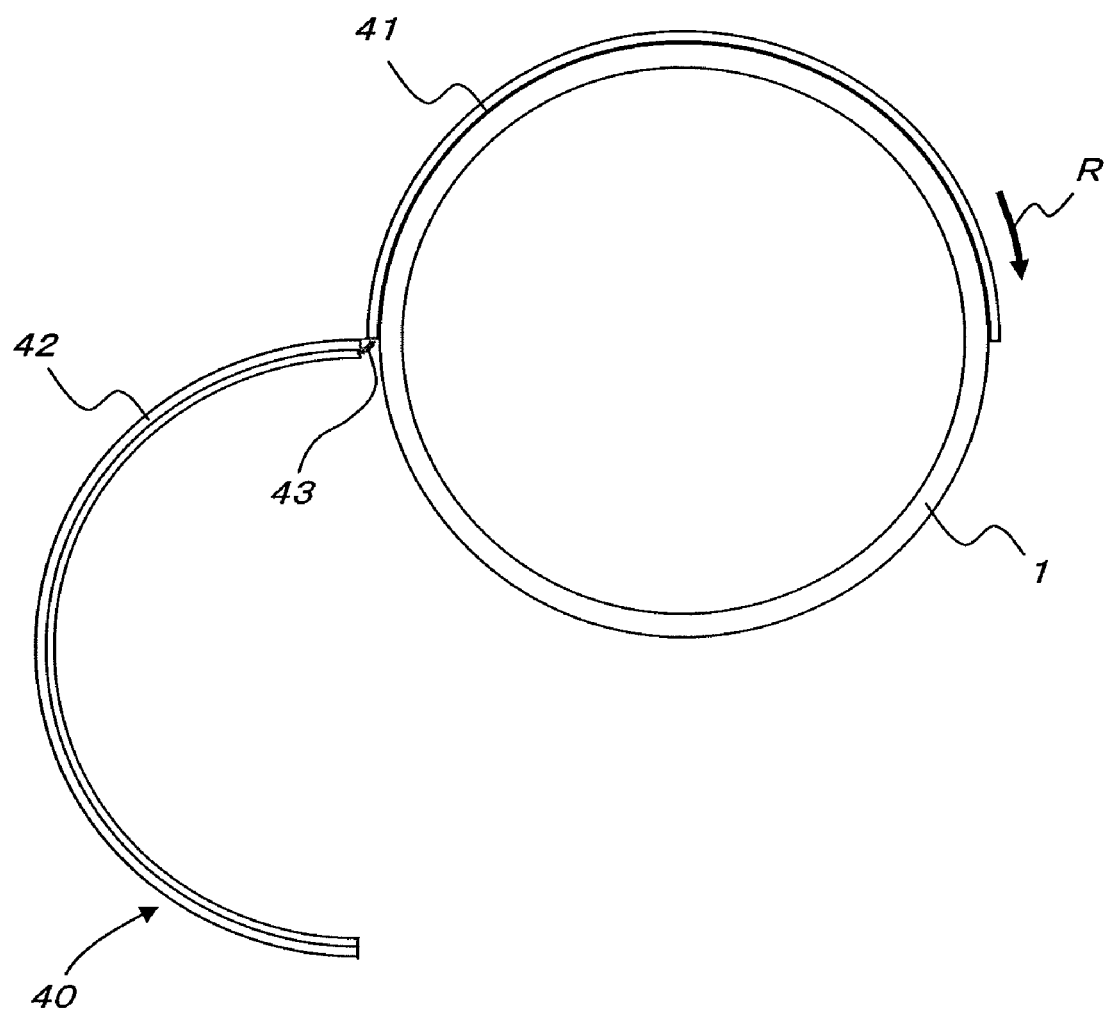
FIG. 4 is a front view of what is shown in FIG. 3.

A worker (not shown) puts the lock ring 40 on the gutter band 11 of the rim base 1 of the multi-piece rim (both the inner and outer multi-piece rims 100J and 100) as illustrated in FIGS. 3 and 4.

The portions 41 and 42 of the lock ring, when free or not fitted in the gutter band 11, have an inside diameter which matches the outer shape of the periphery of the gutter band 11 matched to the shape of the lock ring when they are fitted. However, the inside diameter of the portions 41 and 42 of the lock ring, when free or not fitted in the gutter band 11, may be larger or smaller than the outer shape of the periphery of the gutter band 11 matched to the shape of the lock ring when they are fitted.

At this stage, as illustrated in FIG. 3, the portion 41 of the lock ring (one portion of the two-piece lock ring) put and held on the gutter band 11 of the rim base is fitted in the groove 11*a* of the gutter band 11.

In order to attain the status as illustrated in FIG. 3 in which the portion 41 of the lock ring (one portion of the two-piece lock ring) is held on the gutter band 11 of the rim base and fitted in the groove 11*a* of the gutter band 11, the worker should throw and put the lock ring 40 over the gutter band 11 of the rim base.

Alternatively, the status illustrated in FIG. 3 can be attained by first fitting the end 41*b* of the portion 41 of the lock ring 40 in the groove 11*a* of the gutter band 11 and then pushing the portion 41 inward.

Next, in the status illustrated in FIGS. 3 and 4, the worker holds and pulls or push one end of the lock ring 40 to move the lock ring 40 in the direction indicated by arrow R. Then, it is arranged so that as illustrated in FIG. 5, the ends 41*a* and 42*a* of the portions 41 and 42 of the two-piece lock ring which are coupled by the wire 43 (indicated by arrow A in FIG. 5) are vertically in the uppermost position (direction in arrow UD in FIG. 5) and the uncoupled ends 41*b* and 42*b* are vertically in the lowermost position.

Figure 5:
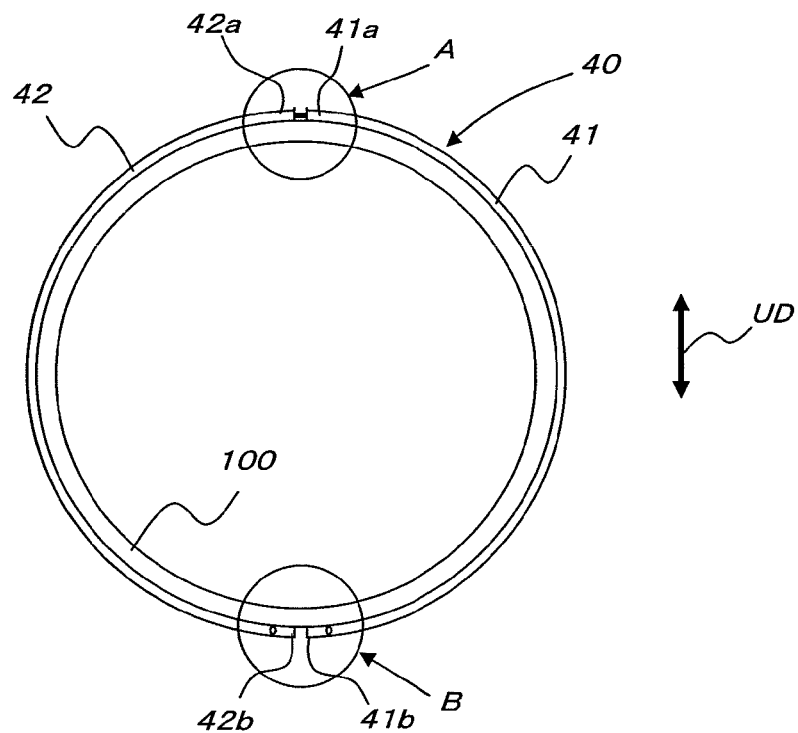
FIG. 5 is an intermediate stage in attachment of the lock ring in the first embodiment.
Figure 6:
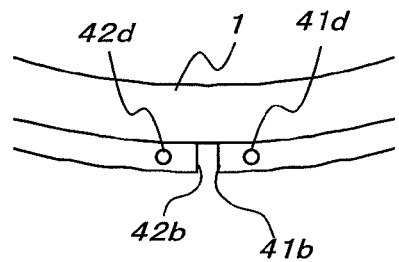
FIG. 6 is an enlarged view of area B in FIG. 5.

FIG. 6 shows, in enlarged form, the area where the uncoupled ends 41*b* and 42*b* of the two-piece lock ring 40 in FIG. 5 face each other (area indicated by arrow B in FIG. 5).

As illustrated in FIGS. 5 and 6, internally threaded screw holes 41*d* and 42*d* are formed in the lateral faces of the uncoupled ends 41*b* and 42*b* in FIGS. 3 to 6.

In order to fasten the ends 41*b* and 42*b* of the lock ring together, a plate 8 (FIG. 7) is set on the ends 41*b* and 42*b* and bolts B2 are passed through bolt holes 81 of the plate 8 and engaged with the screw holes 41*d* and 42*d*.

Figure 7:
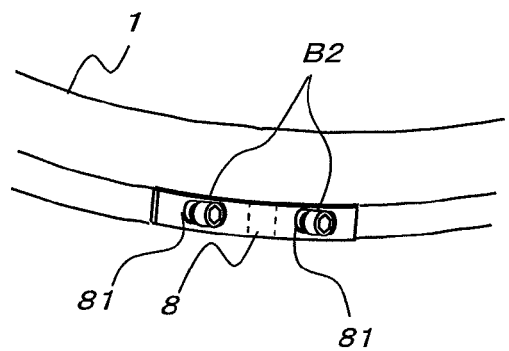
FIG. 7 is a view showing the final stage in attachment of the lock ring in the first embodiment.

As illustrated in FIG. 7, the ends 41*b* and 42*b* of the lock ring 40 are coupled by fixing the plate 8 with the bolts B2.

To remove tires for tire rotation, the above procedure should be reversed.

Specifically, in the status shown in FIG. 7, by removing the bolts B2, the plate 8 is removed to uncouple the ends 41*b* and 42*b* of the lock ring 40. By holding and pulling or pushing one of the ends 41*b* and 42*b* of the lock ring 40 in this status, the lock ring 40 comes off the gutter band 11 of the rim base after it becomes as illustrated in FIGS. 3 and 4.

By removing the plate 8 shown in FIG. 7 from the coupled ends 41*b* and 42*b* in this way, the lock ring 40 shown in FIGS. 1 to 7 according to the first embodiment can be easily removed from the gutter band 11 of the rim base.

After that, like the prior art shown in FIG. 17, by removing the side rings 2 and bead seat bands 3 and pulling out the outer tire 6 and inner tire 6 toward the direction indicated by arrow Y (direction in which they are away from the machine body), only the tires can be removed from the machine body, instead of being removed together with the multi-piece rim from the hub of the machine body. Also only the tires can be attached to the machine body.

As explained above, according to the first embodiment, by coupling the ends 41*a* and 42*a* of the portions 41 and 42 of the lock ring 40 divided in two portions (for example), by means of a coupling member (for example, wire 43), and fitting an end (41*b* or 42*b*) not coupled by means of a coupling member (for example, wire 43) in the gutter band groove 11*a* and pushing it in, the whole of the two-piece lock ring 40 is securely fitted in the gutter band groove 11*b* and held in the so-called "locked" state.

Alternatively, the so-called "locked" state is attained by throwing and putting the two-piece lock ring 40 over the gutter band 11 of the rim base and fitting the circular arc projections 41*c* and 42*c* of the lock ring 40 in the gutter band groove 11*a*.

Then, by coupling the uncoupled ends 41*b* and 42*b* using the plate 8 and bolts B2, the tires 6 and multi-piece rims 100 and 100J are accurately assembled.

Furthermore, by reversing the procedure, the lock ring 40 can be easily and properly removed from the rim base 1.

Once one portion (for example, 41) of the two-piece lock ring 40 is fitted in the gutter band groove 11*b* to some extent as illustrated in FIGS. 3 and 4, the rim base 1 bears the weight of the lock ring 40. For this reason, even when the tire diameter is large and the mass of the lock ring 40 is large, in many cases much labor is not required to support the lock ring 40 and a special machine need not be prepared.

Furthermore, according to the first embodiment, by coupling the ends 41*a* and 42*a* of the portions 41 and 42 of the two-piece lock ring 40 by a coupling member (for example, wire 43), the two-piece lock ring 40 can be treated as a single member. Therefore, the number of components to be managed can be decreased.

Furthermore, as explained referring to FIGS. 3 to 7, even though the lock ring 40 is divided in two, fastening work or unfastening work is needed only at one point for one lock ring 40. Therefore, there is no increase in the number of tasks needed to attach or remove tires.

Figure 8:
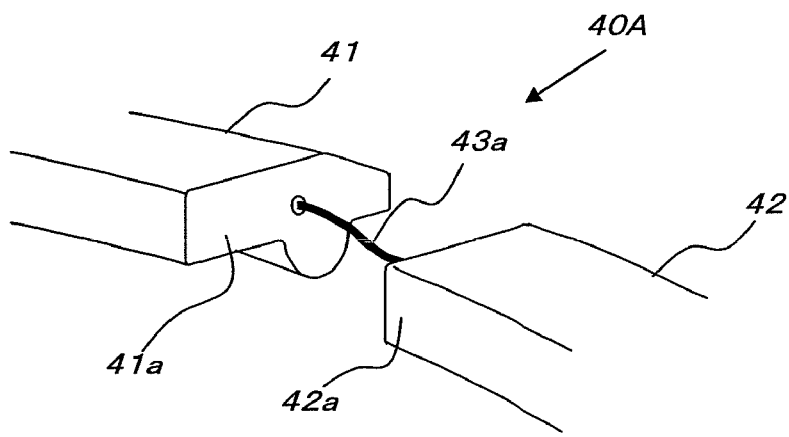
FIG. 8 is a perspective view of the main part of a second embodiment of the present invention.

FIG. 8 shows a second embodiment.

In the second embodiment in FIG. 8, ends of portions 41 and 42 of the lock ring divided in two are coupled by a wire body 43*a* as in the first embodiment.

However, while in the first embodiment the wire 43*a* is integral with the washers 43*b* and fastened and fixed on the portions 41 and 42 of the lock ring with bolts 44, in the second embodiment both ends of the wire 43*a* are directly embedded in ends 41*a* and 42*a* of the portions 41 and 42 of the lock ring 40A divided in two respectively.

The lock ring 40A shown in FIG. 8 has the same construction as in the first embodiment except the abovementioned.

The procedure of attaching the lock ring 40A to the rim base 1 or removing it from the rim base 1 is also the same as in the first embodiment.

The wire 43a which is used in the first embodiment and second embodiment is a stranded high-strength steel wire (for example, piano wire); however, wire of high-strength resin fiber (for example, carbon fiber or the like) may be used instead of steel wire.

Figure 9:
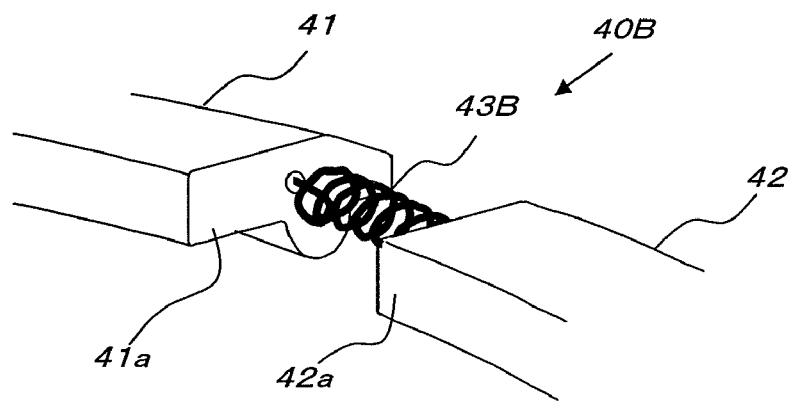
FIG. 9 is a perspective view of the main part of a third embodiment of the present invention.

FIG. 9 shows a third embodiment.

In the third embodiment in FIG. 9, a steel coil spring 43B is chosen as a coupling member. Both ends of the coil spring 43B are directly embedded in ends 41a and 42a of portions 41 and 42 of a lock ring 40B.

The lock ring 40B shown in FIG. 9 has the same construction as in the first embodiment and second embodiment except the abovementioned. The procedure of attaching the lock ring 40B to the rim base 1 or removing it from the rim base 1 is also the same as in the first embodiment and second embodiment.

Figure 10:
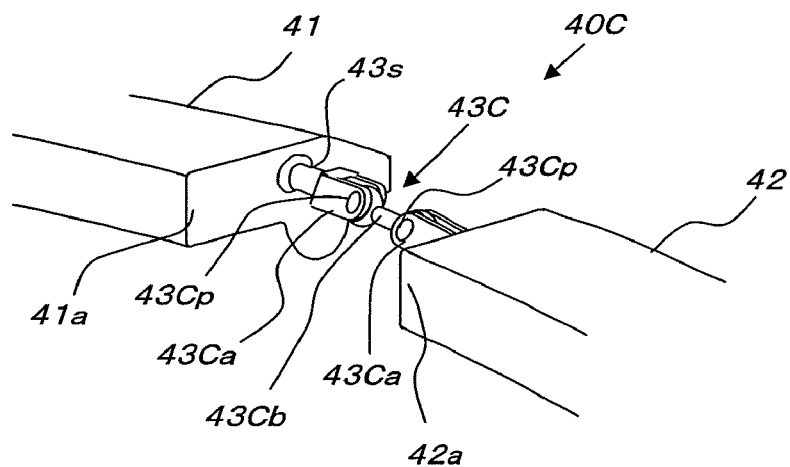
FIG. 10 is a perspective view of the main part of a fourth embodiment of the present invention.

FIG. 10 shows a fourth embodiment.

In the fourth embodiment in FIG. 10, a multi-joint coupling link 43C is used as a coupling member.

The multi-joint link 43C is comprised of a pair of yokes 43Ca, a pair of hinge pins 43Cp and a coupling link 43Cb having hinge pin penetration holes at both ends and the tips of the shafts 43s of the paired yokes 43Ca are embedded in the ends 41a and 42a of the portions 41 and 42 of a lock ring 40C.

The lock ring 40C in FIG. 10 has almost the same construction as in the first to third embodiments except the abovementioned. The procedure of attaching the lock ring 400 to the rim base 1 or removing it from the rim base 1 is the same as in the first to third embodiments.

Figure 11:
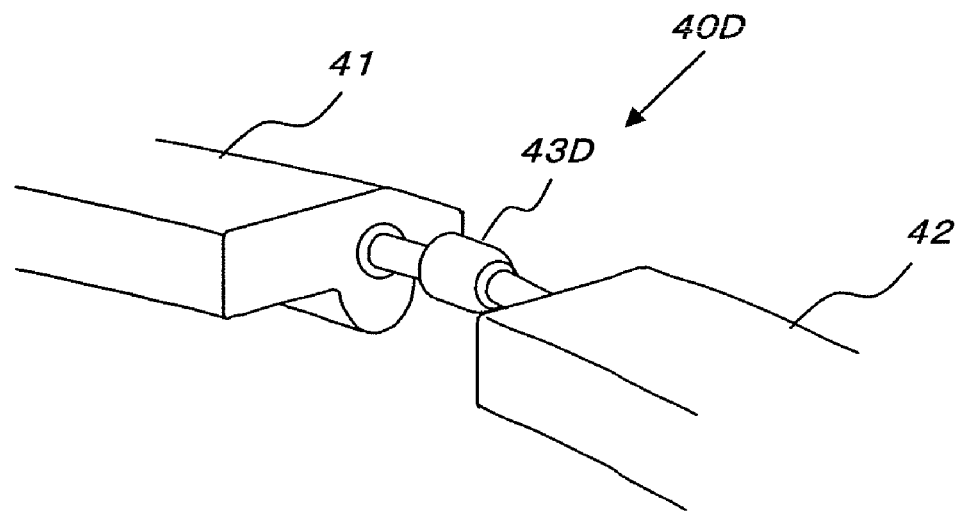
FIG. 11 is a perspective view of the main part of a fifth embodiment of the present invention.

FIG. 11 illustrates the joint of a lock ring 40D in a fifth embodiment in a three-dimensional manner.

In the fifth embodiment in FIG. 11, a universal joint 43D with a ball joint is chosen as the coupling member.

The fifth embodiment is almost the same as in the first to fourth embodiments except that the universal joint 43D is used as the coupling member and uses almost the same procedure of attaching the lock ring 40D to the rim base 1 or removing it from the rim base 1 as in the first to fourth embodiments.

Figure 12:
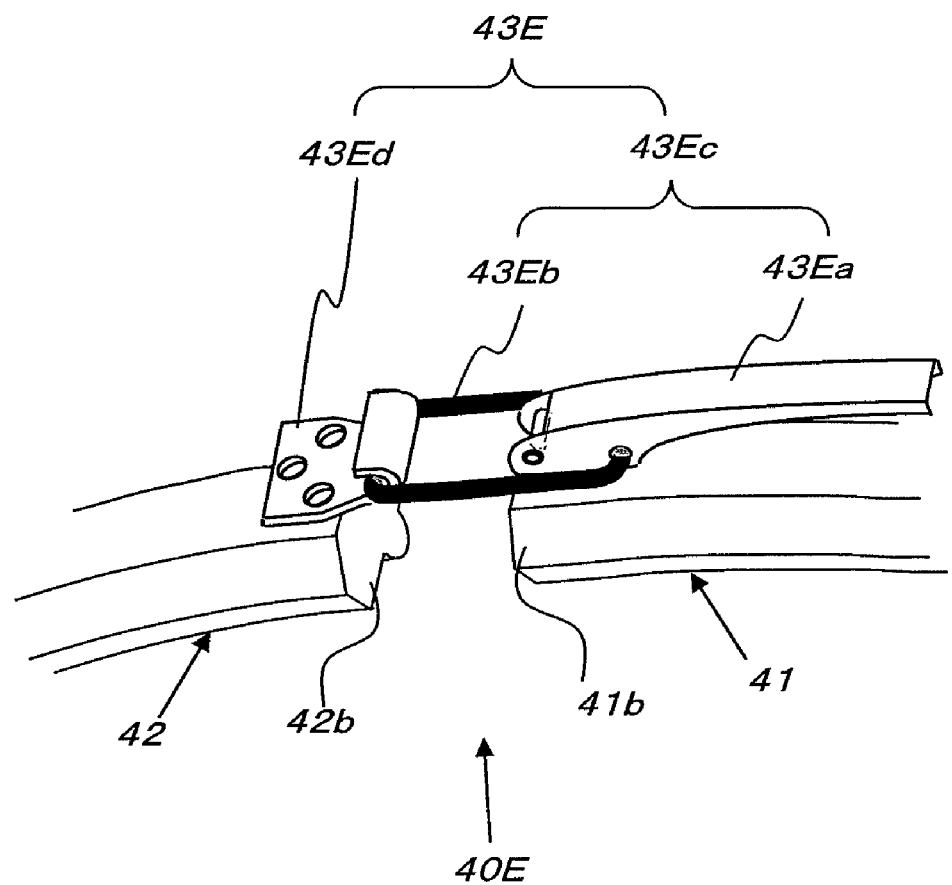
FIG. 12 is a perspective view of the main part of a sixth embodiment of the present invention.

FIG. 12 shows a sixth embodiment.

In FIG. 12, the lock ring is designated by reference numeral 40E. FIG. 12 three-dimensionally illustrates the coupled ends 41b and 42b of the half portions 41 and 42 of the lock ring which are opposite to the previously coupled ends thereof in the first to fifth embodiments.

In the sixth embodiment in FIG. 12, the ends 41b and 42b of the half portions 41 and 42 which are opposite to the previously coupled ends thereof are coupled using a fastener for industrial use or adjuster 43E.

The adjuster 43E is comprised of a first member 43Ec and a second member 43Ed.

The first member 43Ec has a lever 43Ea and a link 43Eb which has a U-shaped end with a closed tip and the other end turnable on the lateral sides of the lever 43Ea. The second member 43Ed has a tip bent in the shape of a U which faces the first member 43Ec.

For example, the first member 43Ec is attached to one portion 41 of the lock ring 40E and the second member 43Ed is attached to the other portion 42 of the lock ring 40E.

In assembling the multi-piece rim, for final coupling of the portions 41 and 42, the link 43Eb of the first member 43Ec should be attached to the U-shaped part of the second member 43Ed by a simple operation of the lever 43Ea of the first member.

In separating the tire from the multi-piece rim, for removal of the two-piece lock ring 40, the link 43Eb of the first member 43Ec should be removed from the U-shaped part of the second member 43Ed by a simple operation of the lever 43Ea of the first member.

By using a fastener for industrial use or an adjuster 43E as illustrated in FIG. 12, the ends of the portions of the lock ring can be fastened by a simple operation.

The present invention can be applied to the type of rim which has no disk, though FIG. 17 shows the type which has a disk.

Figure 13:
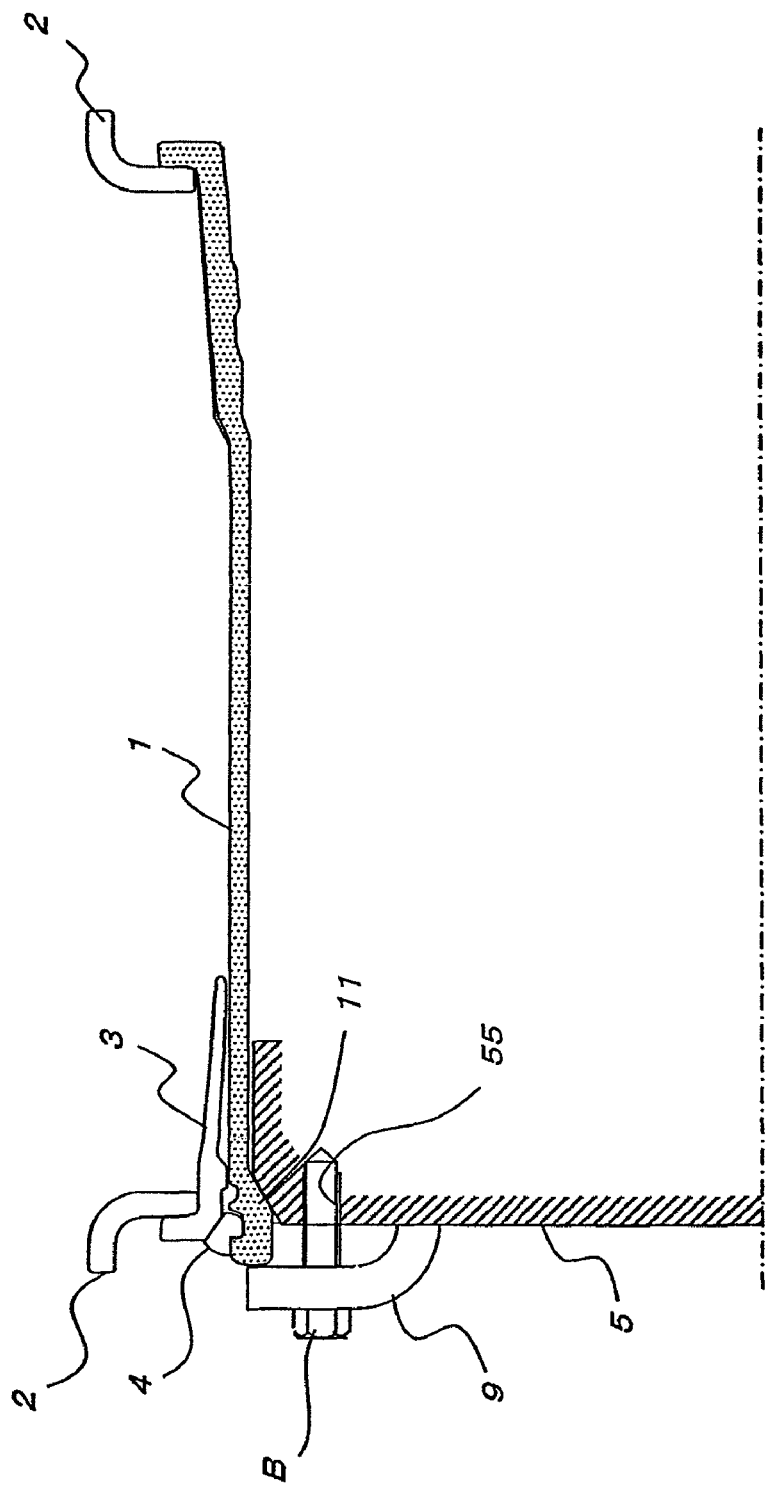
FIG. 13 is a view showing that a multi-piece rim without a disk is attached to the hub.

FIG. 13 shows that a rim without a disk is attached to the hub of the machine body.

In FIG. 13, an internally threaded screw hole 55 is formed in the hub 5 of the machine body. A clamp 9 is located on the outside of the rim (left end of the rim base 1) and a through hole through which a bolt B is to be passed is formed in the clamp 9. The bolt B penetrating the clamp 9 is engaged with the screw hole 55 formed in the hub 5.

The rest of the construction is the same as described in reference to FIG. 17.

FIGS. 18 to 26 show a seventh embodiment.

Figure 18:
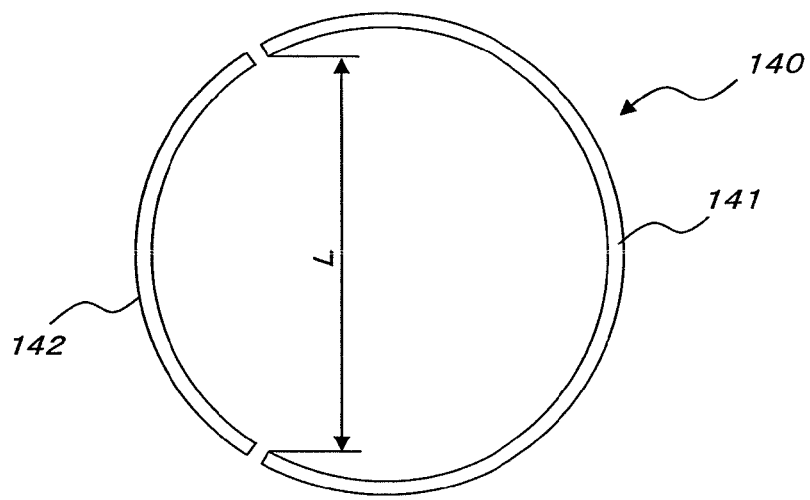
FIG. 18 is a schematic diagram showing the general construction of the lock ring in a seventh embodiment of the present invention.
Figure 19:
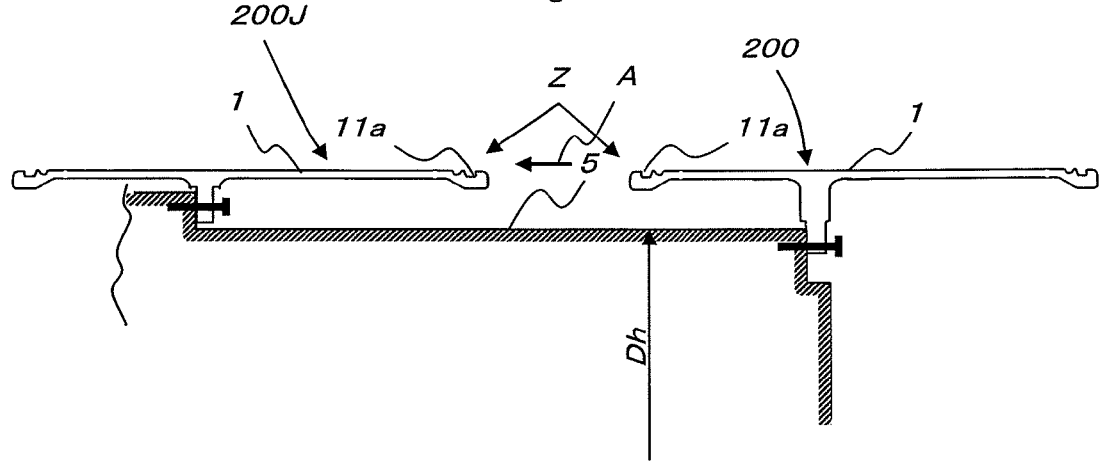
FIG. 19 is a sectional view illustrating how the lock ring in the seventh embodiment is attached.

In FIGS. 18 to 26, the construction of the multi-piece rims (multi-piece rims designated by reference numerals 200J and 200 in FIG. 19; the side rings, bead seat bands and lock rings are not shown) are the same as the multi-piece rims shown in FIG. 17 except a lock ring 140 according to the seventh embodiment.

In FIG. 19, the inner multi-piece rim 200J has gutter bands 11 at both its ends like the outer multi-piece rim 200; however, it is also possible that a back flange 12 is provided on the inner side of the inner rim base 1 as shown in FIG. 17.

FIG. 18 illustrates the whole lock ring 140 in its free state or not fitted in the gutter bands 11. In FIG. 18, the lock ring, the whole of which is designated by reference numeral 140, is comprised of a first portion 141 and a second portion 142 where the circumferential length of the first portion 141 is longer than the circumferential length of the second portion 142.

The first portion 141 is formed into a substantially C shape as a circular ring with a cut portion. The chord length L of the cut portion of the first portion 141 (distance between both ends) is substantially equal to the diameter of the hub, Dh (see FIGS. 19 and 20). This is intended to ensure that when the lock rings are attached to, or removed from, the outer gutter band 11 of the inner rim base and the inner gutter band 11 of the outer rim base, attachment or removal can be done without causing interference between the first portion 141 and the hub, and the first portion 141 can be securely fixed in the gutter band 11.

Figure 22:
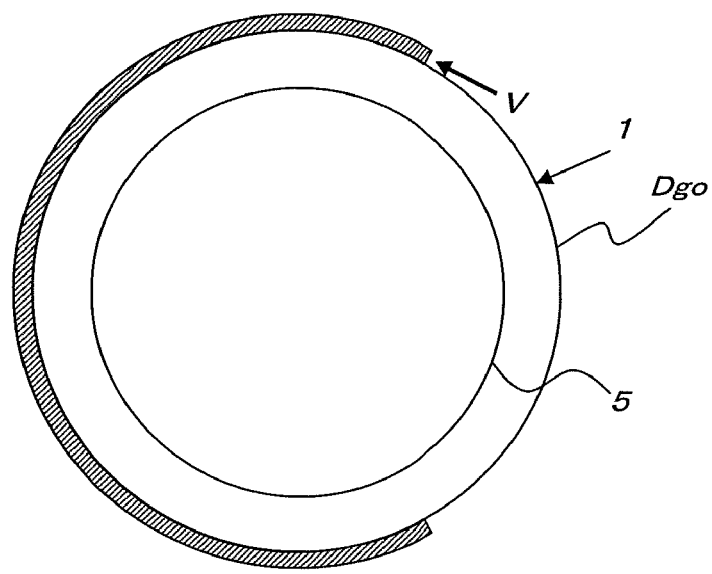
FIG. 22 is a diagram illustrating the third step in the method for assembling the multi-piece rim in the seventh embodiment.

The second portion 142 has a shape which matches the cut portion in the circular ring of the first portion 141 with the first portion 141 fitted in the gutter band 11 of the rim base 1 as shown in FIG. 22. However, a gap G (see FIG. 24) is provided to absorb an machining error and facilitate assembly.

The ends of the first portion 141 and the ends of the second portion 142 are coupled by coupling members 8 (see FIG. 24) and known fastening members (for example, coupling bolts, not shown).

An eighth embodiment which will be described later (FIG. 27) and its variation (FIG. 28) concern fastening (coupling) of the ends of the first portion 141 and the ends of the second portion 142 with the coupling member 8.

Figure 24:
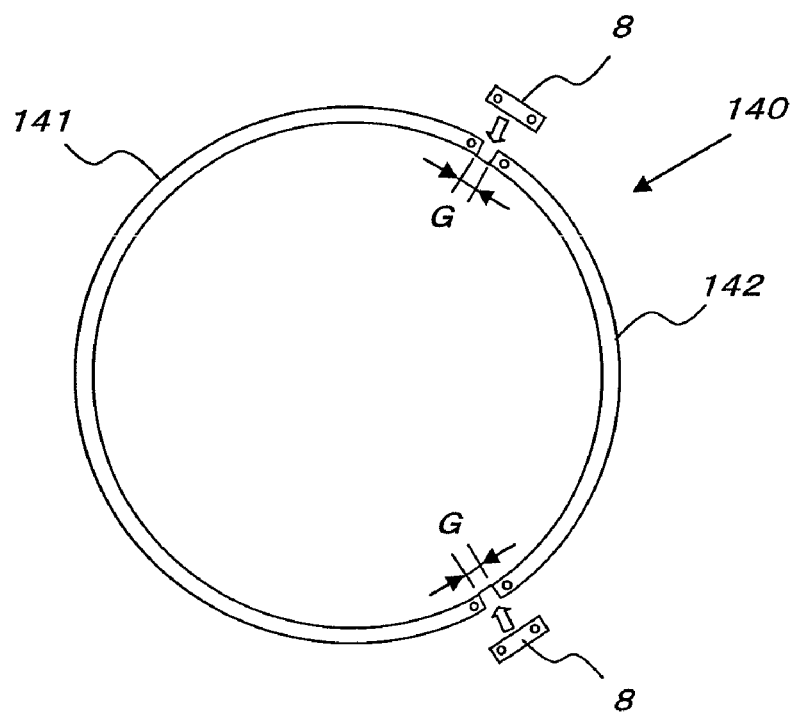
FIG. 24 is a diagram illustrating the fourth step in the method for assembling the multi-piece rim in the seventh embodiment.
Figure 25:
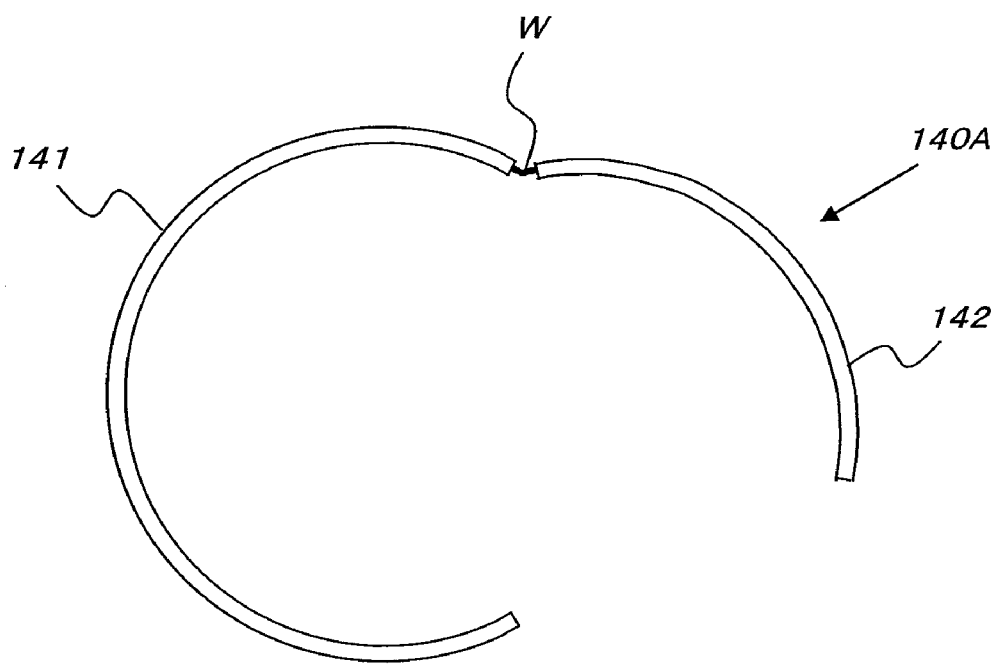
FIG. 25 is a front view showing a variation of the lock ring coupling member in the seventh embodiment.
Figure 26:
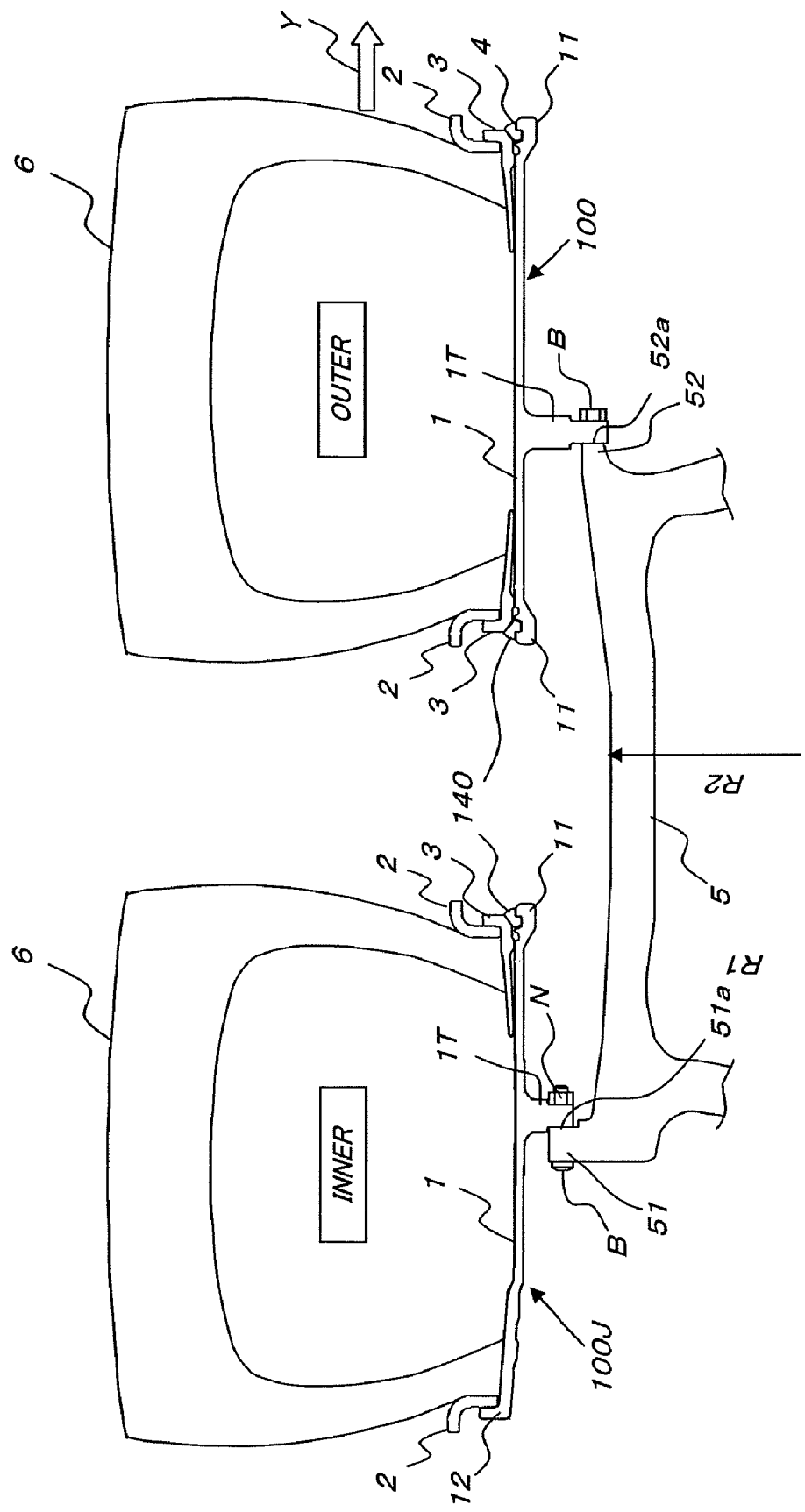
FIG. 26 is a sectional view of the main part of a wheel which uses the multi-piece rim according to the seventh embodiment.

The lock ring 140 according to the seventh embodiment in FIGS. 18 to 26 is mainly used in an area indicated by arrow Z in FIG. 19 or an area between the inner tire and outer tire in FIG. 26.

Figure 20:
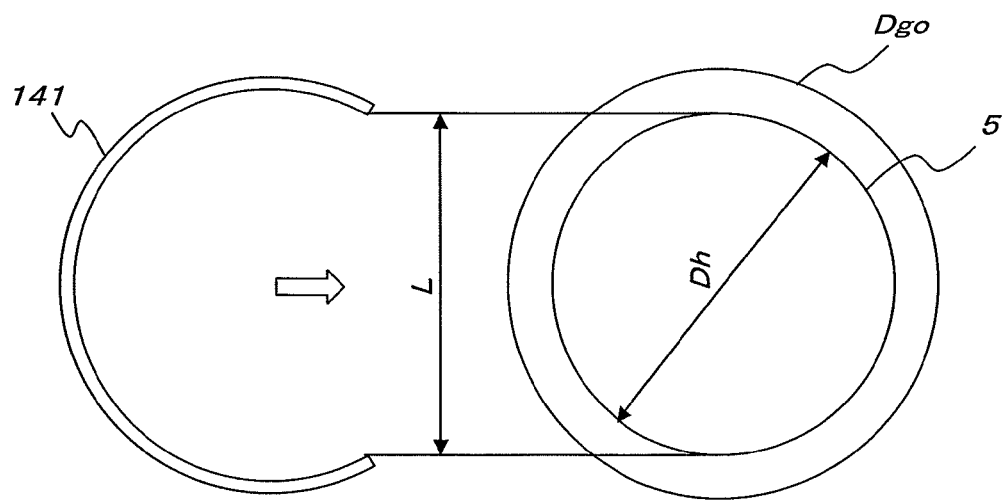
FIG. 20 is a diagram illustrating the first step in the method for assembling the multi-piece rim in the seventh embodiment.

FIG. 20 is a view taken in the direction indicated by arrow A in FIG. 19.

In the lock ring 140 in the state shown in FIG. 20 (free state), the distance L between both ends of the cut portion in the first portion 141 is almost equal to the diameter of the hub, Dh. In addition, the inside diameter of the first portion 141 is substantially equal to the curvature radius of the periphery of the gutter band 11 which matches the shape of the lock ring 140 fitted in the rim base 1 or small enough to obtain the elastic repulsive force required to hold the first portion 141 in the gutter band 11. Therefore, simply by fitting the first portion 141 into the gutter band 11, the first portion 141 can be held or locked in a way not to come off the gutter band 11.

The first portion 141 of the lock ring 140 is larger in terms of the distance (chord length) L between both ends of the cut portion (opening portion) and shorter in terms of the circumferential length than a one-piece lock ring of the prior art, which means that although the cut portion of the first portion 141 must be expanded when attaching it to, or removing it from, the gutter band 11, the amount of required expansion is smaller than in the case of the one-piece lock ring of the prior art.

In addition, the first portion 141 formed into a substantially C shape as a circular ring with a cut portion can be fitted in the gutter band groove 11a even if the elastic repulsive force in the radial direction (elastic repulsive force which acts to cause radial contraction) is relatively weak.

Similarly, even when the curvature radius of the first portion 141 is larger than the curvature radius of the gutter band groove 11a, the first portion 141, formed into a substantially C shape, can be attached or locked without causing it to come off the gutter band groove 11a.

Furthermore, in some cases, the force required to expand the cut portion (opening portion) in the first portion 141, formed into a substantially C shape, against the above-mentioned elastic repulsive force is smaller than in the case of an one-piece type lock ring of the prior art. If that is the case, the force required to fit the first portion 141 in the gutter band groove 11a is smaller than in the case of the one-piece type lock ring of the prior art.

For these reasons, according to the seventh embodiment shown in FIGS. 18 to 26, it is easy to expand the cut portion (opening portion) in the first portion 141 and fit it in the gutter band 11 and labor required to fit it is far less than in the case of the one-piece type lock ring of the prior art.

Here, although it is possible that the distance L between both ends of the cut portion in the first portion 141 of the lock ring 140 (chord length of the opening portion of the C-shaped ring) is smaller than the diameter of the hub Dh, attachment and removal would be difficult due to interference with the hub 5.

On the other hand, it is also possible that the distance L between both ends of the cut portion in the first portion 141 of the lock ring 140 (chord length of the opening portion of the C-shaped ring) is larger than the diameter of the hub Dh. However, if the distance L is larger than the diameter of the hub Dh and too large (as compared with the diameter of the hub Dh), it should be kept in mind that there is a possibility that the first portion 141 cannot be held in the gutter band 11 only by the elastic repulsive force of the first portion 141 while the first portion 141 is fitted in the gutter band 11 as illustrated in FIG. 22. When the lock ring 140 or the first portion 141 is in the steady state (shown in FIG. 20) and the curvature radius of the lock ring 140 (or the first portion 141) is smaller than the curvature radius of the gutter band 11, the lock ring 140 (or the first portion 141) can be held in the gutter band 11 without any difficulty.

It is preferable that the second portion 142 have the same curvature radius as the gutter band 11, though not shown in FIG. 20.

Although it is possible that the curvature radius of the second portion 142 is not equal to that of the gutter band 11, it would be necessary to deform the second portion 142 according to the curvature radius of the gutter band groove 11a in order to fit it in the gutter band groove 11a. Since the second portion 142 is shorter than the first portion 141, a lot of force is required to deform it, causing an excessive force to be applied to the coupling member 8.

A method for attaching the lock ring 140 to the rim 1 is explained below referring to FIGS. 20 to 23.

First, at the step in FIG. 20, the hub 5 is moved so that it is inserted in the cut portion of the first portion 141 in the lock ring 140. Then, the first portion 141 is adjusted so that it is placed on the periphery of the hub 5 as shown in FIG. 21.

Figure 21:
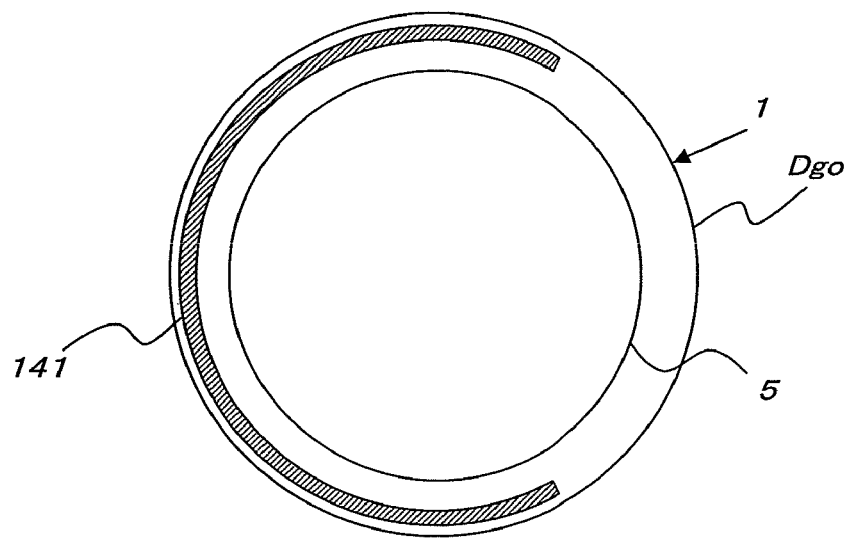
FIG. 21 is a diagram illustrating the second step in the method for assembling the multi-piece rim in the seventh embodiment.

In FIGS. 20 and 21, a reference symbol Dgo represents the outside diameter of the gutter band 11 of the rim.

At the next step in FIG. 22, the cut portion of the first portion 141 placed on the periphery of the hub 5 is expanded beyond the periphery of the gutter band 11 and fitted in the gutter band groove 11a (outside diameter Dgo).

When the first portion 141 is fitted in the gutter band groove 11a as illustrated in FIG. 22, the first portion 141 has an elastic repulsive force which acts to contract it inward in the radial direction, so it does not come off the gutter band groove 11a and does not fall off the rim 1. In other words, the first portion 141 is held fitted in the gutter band 11a by its elastic repulsive force.

Figure 23:
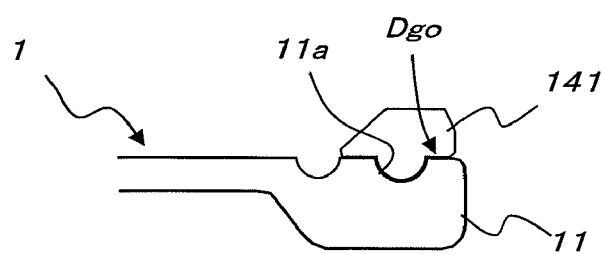
FIG. 23 is a view taken in the direction indicated by arrow V in FIG. 22.

FIG. 23 is a view taken in the direction indicated by arrow V in FIG. 22 and shows that the first portion 141 (more specifically the inside diameter side of the first portion 141) is fitted in the gutter band groove 11a.

In the case of a two-piece type lock ring of the prior art which is equally divided, fastening of the lock ring requires two workers before and behind the tire in the longitudinal direction of the vehicle. On the other hand, when the lock ring 140 according to the seventh embodiment in FIGS. 18 to 26 is used, if the cut portion of the first portion 141 or the second portion 142 is located, for example, on the rear side of the vehicle, fastening of the lock ring can be done by a worker who is behind the vehicle.

In other words, when fastening the lock ring 140 according to the seventh embodiment, a spot where fastening work is needed is only an area shown on the right in FIG. 22 (for example, on the rear side of the vehicle), so one worker can visually check to see if the first portion 141 is securely locked in the groove 11a of the gutter band 11 and fasten the lock ring.

When confirming that the first portion 141 is securely locked in the groove 11a of the gutter band 11, it is important to check the fitting conditions at both ends of the first portion 141 (the upper and lower ends shown in FIG. 22). As mentioned above, with the lock ring 140 according to the seventh embodiment, one worker can check (visually) the fitting conditions at both ends of the first portion 141 at a time, so it can be confirmed properly and efficiently that the first portion 141 is securely locked in the groove 11a of the gutter band 11 and safety is thus increased.

In other words, in the two-piece type lock ring according to the seventh embodiment, the effect that two joints can be checked at a time is very meaningful for improvement in labor saving and working efficiency in assembling work.

At the step in FIG. 24, the second portion 142 is placed in the cut portion of the first portion 141. Since the mass of the second portion 142 is not large, placement of the second portion 142 can be done simply by fitting the second portion 142 along the gutter band groove 11a. In other words, labor required to fit the second portion 142 is very light.

After fitting of the second portion 142 in the gutter band groove 11a has been finished, the ends of the first portion 141 are coupled with the ends of the second portion 142 by coupling members 8. This concludes assembly of the multi-piece rim.

As for the lock ring 140 in the seventh embodiment, in the area where the inner and outer rims face each other as illustrated in FIGS. 19 and 26, one lock ring is attached to each of them and attachment may be first done on either of the inner and outer sides.

In coupling the first portion 141 and second portion 142, it is preferable that a flexible coupling member be used for one joint and a tightening type coupling member such as a screw be used for the other joint.

Next, a method for removing the lock ring 140 according to the seventh embodiment from the multi-piece rim will be explained.

First, the coupling members 8 are removed from the ends of the first portion 141 and the ends of the second portion 142 in the reverse order of the procedure described above in reference to FIG. 24. Then, the second portion 141 is removed from the gutter band groove 11a (the result is as shown in FIG. 22).

Next, referring to FIGS. 21 and 22, the cut portion of the first portion 141 is expanded in the reverse order of the above procedure and moved toward the outer periphery of the hub 5 beyond the gutter band 11.

Then, the first portion 141 placed on the periphery of the hub 5 is removed from the hub 5 in the reverse order of the procedure described above in reference to FIG. 20.

The size of the opening of the first portion 141 (C-shaped ring) (distance between both ends of the cut portion, L; chord length of the opening of the C-shaped ring) is determined so that when fitted in the gutter band groove 11a, the first portion 141 can be held fitted in the gutter band groove 11a by the elastic repulsive force of the first portion 141 itself (elastic repulsive force which acts to cause inward contraction in the radial direction).

In other words, the distance between both ends of the cut portion of the first portion 141, L (chord length of the cut portion) is set so as to obtain an elastic repulsive force enough to hold the first portion 141 fitted in the gutter band groove 11a.

FIGS. 18 to 24 show a case that the first portion 141 and the second portion 142 are separate; however, it is possible to couple one end of the first portion 141 with one end of the second portion 142 with a flexible coupling member W in advance like the lock ring 140A shown in FIG. 25. In other words, the lock ring 140A shown in FIG. 25 is a variation of the seventh embodiment. This can further reduce labor required to attach and remove the lock ring 140.

For the variation in FIG. 25, any of the coupling members in the embodiments shown in FIGS. 1 and 8 to 12 may be used as the flexible coupling member W.

Figure 27:
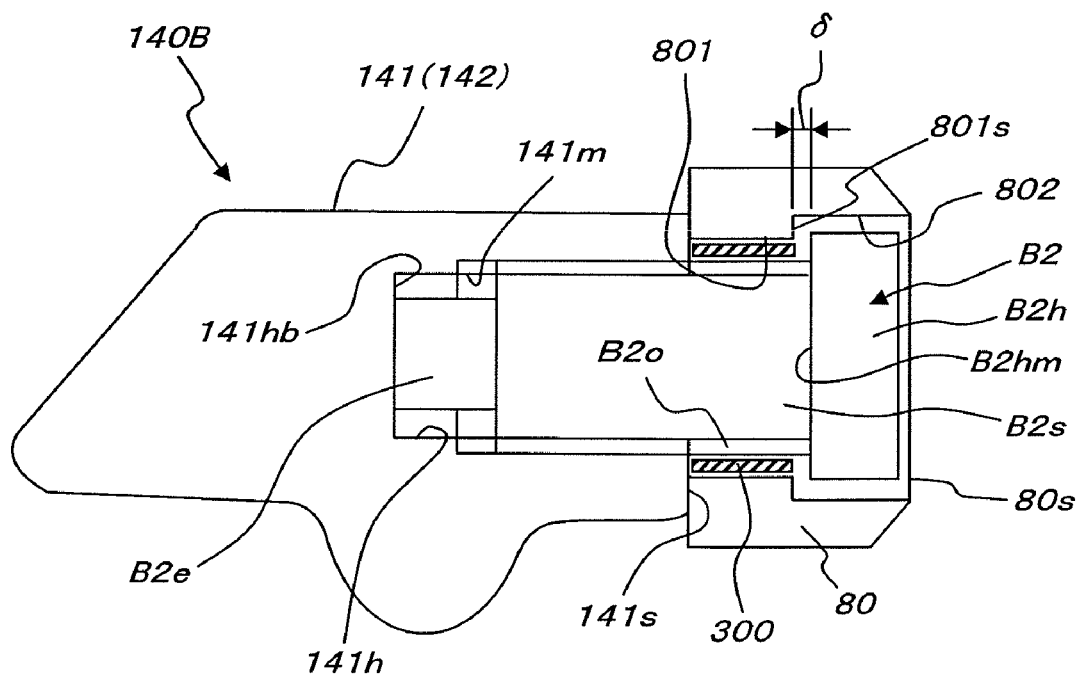
FIG. 27 is a sectional view of the main part of an eighth embodiment.

FIG. 27 shows an eighth embodiment.

The first portion 141 and second portion 142 of the lock ring 140 are coupled with each other using a coupling member including a bolt.

Here, there is a problem that during a run of the vehicle, a flipped stone or something like that may hit the coupling member and deform various constituent parts of the coupling member and damage or break the bolt.

The eighth embodiment shown in FIG. 27 is an embodiment which concerns fastening of the coupling member and lock ring.

In the eighth embodiment in FIG. 27, for example, a synthetic resin collar is disposed between an insertion hole 801 in a coupling member 80 and a bolt B2 and the bolt is inserted inside the collar. This prevents the bolt B2 from fracturing.

In FIG. 27, in the first member 141 (or the second member 142) of a lock ring 140B, a blind hole 141h is pierced in an end face 141s on the side away from the tire center and an internal thread 141m is formed in the blind hole 141h. FIG. 27 illustrates that the external thread B2o of the coupling bolt B2 is engaged with the internal thread 141m.

On the other hand, the insertion hole 801 is formed in the coupling member 80 and the shaft B2s of the coupling bolt B2 is to be inserted in the insertion hole 801. A head housing hole 802 which houses a bolt head B2h is formed in a surface 80s of the coupling member 80 on the side away from the lock ring 140B.

The synthetic resin collar 300 is disposed between the insertion hole 801 in the coupling member 80 and the shaft B2s of the coupling bolt B2. In FIG. 27, the collar 300 is expressed by hatching.

Though not clearly shown in FIG. 27, the outside diameter of the collar 300 is slightly larger than the inside diameter of the insertion hole 801.

An unthreaded tip B2e is provided on the opposite side of the bolt head B2h of the coupling bolt B2. In FIG. 27, the unthreaded tip B2e abuts on the bottom 141hb of the blind hole 141h.

When coupling the portions 141 and 142 of the lock ring 140B, first the coupling member 80 is made to face the lock ring 140B in a way that the position of the blind hole 141h formed in the end face 141s matches the position of the insertion hole 801 formed in the coupling member 80. Then, the cylindrical collar 300 of synthetic resin and the coupling bolt B2 are inserted from the head housing hole 802 of the coupling member 80 and turned to engage the external thread B2o of the coupling bolt B2 with the internal thread 141m of the blind hole 141h. The coupling bolt B2 is turned until its tip B2e touches the bottom 141hb of the blind hole 141h (FIG. 27).

In this state, the cylindrical collar 300 of synthetic resin lies between the bolt B2 and the insertion hole 801.

The length of the tip B2e of the coupling bolt B2 and the depth of the blind hole 141h are set so that as illustrated in FIG. 27, a gap expressed by δ is formed between the step part 801s of the coupling member 80 at which the insertion hole 801 borders on the head housing hole 802, and the end face B2hm of the bolt head B2h on the lock ring 141 side, when the tip B2e of the coupling bolt B2 abuts on the bottom 141hb of the blind hole 141h.

In other words, when the tip B2s of the external thread B2o of the coupling bolt B2 abuts on the bottom 141hb of the blind hole 141h, the coupling bolt B2 and the coupling member 80 are fixed (coupled) while the gap δ is kept.

Due to the presence of such gap δ, the step part 801s of the coupling member 80 does not contact the end face B2hm of the bolt head B2, so metallic contact between the bolt B2 and the coupling member 80 is prevented.

From the applicant's experiment, it has been demonstrated that due to the presence of the cylindrical collar 300 of synthetic resin between the bolt B2 and the insertion bole 801 of the coupling member 80, the possibility that the bolt B2 fractures due to collision of a flipped stone or something like that against the coupling member during running of the vehicle is much smaller than before.

Besides, the lock ring 140B and the coupling member 80 can be coupled without metallic contact between the bolt B2 and the coupling member 80.

The rest of the construction of the eighth embodiment in FIG. 27 and its effect are the same as those of the embodiments shown in FIGS. 1 to 26.

Figure 28:
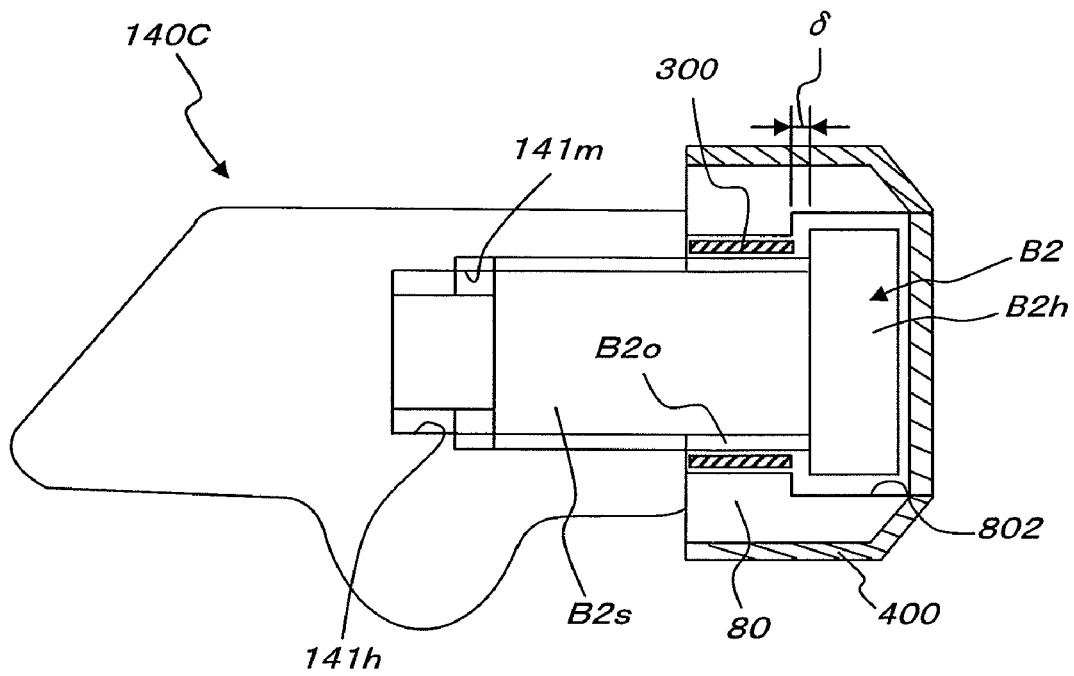
FIG. 28 is a sectional view of the main part of a variation of the eighth embodiment.
Figure 29:
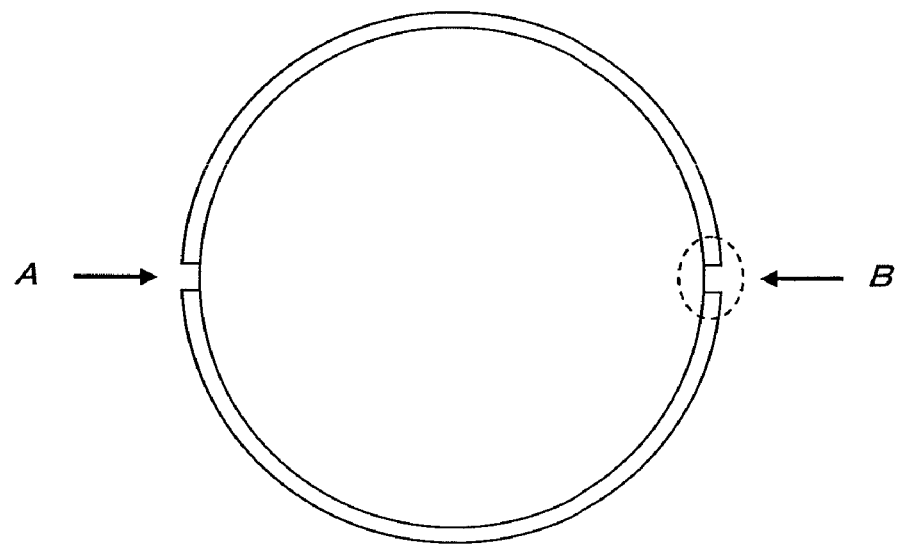
FIG. 29 is a sectional view of the joints of a two-piece type lock ring of the prior art being positioned horizontally.
Figure 30:
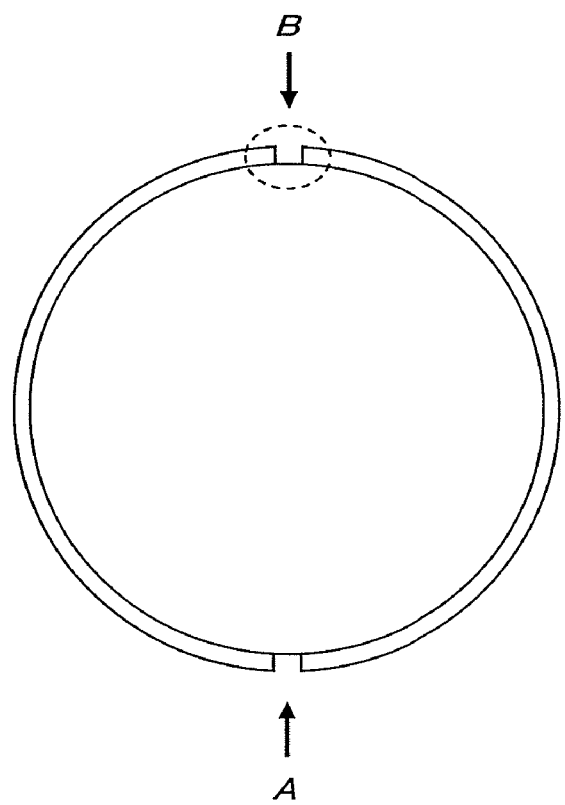
FIG. 30 is a sectional view of the joints of a two-piece type lock ring of the prior art being positioned vertically.

FIG. 28 shows a variation of the eighth embodiment in FIG. 27. The whole lock ring according to the variation in FIG. 28 is designated by a reference numeral 140C.

In the variation in FIG. 28, all the outer surfaces of the coupling member 80 except the surface facing the lock ring 140 are covered with a flexible material 400 such as rubber. The area corresponding to the head housing hole 802 on the coupling member 80's end face opposite to the lock ring 140C is not covered with the flexible material 400. This is because the area is used for fastening or unfastening with the bolt 2B.

In the variation in FIG. 28, since all the outer surfaces of the coupling member 80 except the surface facing the lock ring 140C are covered with the flexible material 400 such as rubber, the impact of a flipped stone or something like that colliding against the coupling member is further relieved and the possibility of fracture of the bolt B3 is further reduced.

The rest of the construction of the variation in FIG. 28 and its effect are the same as those of the eighth embodiment in FIG. 27.

The embodiments shown here are illustrative and not restrictive and the above detailed description thereof is not intended to limit the technical scope of the invention.

For instance, the coupling member which is used to couple the portions of the two-piece lock ring is not limited to the ones shown here or described above. Anything that has a certain degree of flexibility and enough strength to withstand the tension exerted on the lock ring and has a cross sectional area may be used as the coupling member.

In addition, the coupling member 80 in the eighth embodiment in FIG. 27 and the variation in FIG. 28 (variation of the eighth embodiment) can be applied to the first embodiment in FIGS. 1 to 7 and the seventh embodiment in FIGS. 18 to 26.

DESCRIPTION OF THE REFERENCE NUMERALS

1 . . . Rim base
2 . . . Side ring
3 . . . Bead seat band
4, 4A, 40, 40A-40E, 140, 140A, 140B, 140C . . . Lock rings
5 . . . Hub
6 . . . Tire
7 . . . Fitting member
8 . . . Plate
9 . . . Clamp
11 . . . Gutter band
12 . . . Back flange
41, 42 . . . Portions of the divided lock ring
43 . . . Wire
100, 100J . . . Multi-piece rims
141, 142 . . . Portions of the divided lock ring

The invention claimed is:

1. A multi-piece rim for a vehicle, the multi-piece rim comprising:
a rim base being provided with gutter bands at ends thereof, the gutter bands having at least one groove therein;
at least one lock ring to be fitted in the at least one groove formed in the respective gutter bands;
bead seat bands positioned adjacent the ends of the rim base; and
side rings positioned at an inner end and an outer end of the rim base, wherein:
each of the at least one lock ring is divided in two portions in a circumferential direction; and
the portions are coupled at each one end thereof by a flexible coupling member, wherein the flexible coupling member comprises a wire having ring members fixed at both ends thereof and abutting an outer peripheral surface of each respective portion and fixing bolts with the fixing bolts being passed through the ring members and screwed into internally threaded screw holes which are formed at the ends of the portions, respectively.

2. A multi-piece rim for a vehicle, the multi-piece rim comprising:
a rim base being provided with gutter bands at ends thereof, the gutter bands having at least one groove therein;
at least one lock ring to be fitted in the at least one groove formed in the respective gutter bands;
bead seat bands positioned adjacent the ends of the rim base; and
side rings positioned at an inner end and an outer end of the rim base, wherein:
each of the at least one lock ring is divided in two portions in a circumferential direction;
the portions are coupled at each one end thereof by a flexible coupling member, wherein the flexible coupling member comprises a wire having ring members fixed at both ends thereof and abutting an outer peripheral surface of each respective portion and fixing bolts with the fixing bolts being passed through the ring members and screwed into internally threaded screw holes which are formed at the ends of the portions, respectively; and
the two portions of each of the at least one lock ring are coupled at another ends thereof by another coupling member having a coupling bolt attached in a bolt hole in a lateral face of each of the another ends of the two portions of the at least one lock ring.

3. A multi-piece rim for a vehicle, the multi-piece rim comprising:
a rim base being provided with gutter bands at ends thereof, the gutter bands having at least one groove therein;
at least one lock ring to be fitted in the at least one groove formed in the respective gutter bands;
bead seat bands positioned adjacent the ends of the rim base; and
side rings positioned at an inner end and an outer end of the rim base, wherein:
each of the at least one lock ring is divided in two portions in a circumferential direction;
the portions are coupled at each one end thereof by a flexible coupling member, wherein the flexible coupling member comprises a wire having ring members fixed at both ends thereof and abutting an outer peripheral surface of each respective portion and fixing bolts with the fixing bolts being passed through the ring members and screwed into internally threaded screw holes which are formed at the ends of the portions, respectively;
the two portions of each of the at least one lock ring are coupled at another ends thereof by another coupling member having a coupling bolt attached in a bolt hole in a lateral face of each of the another ends of the two portions of the at least one lock ring; and
the flexible coupling member is constructed so as to be able to withstand a tensile force of 2 KN.

4. A multi-piece rim for a vehicle having a double tire arrangement with an inner tire and an outer tire, the multi-piece rim comprising:

a rim base being provided with gutter bands at ends thereof, the gutter bands having at least one groove therein;

at least one lock ring to be fitted in the at least one groove formed in the respective gutter bands;

bead seat bands positioned adjacent the ends of the rim base; and side rings positioned at an inner end and an outer end of the rim base, wherein:

each of the at least one lock ring is divided in two portions in a circumferential direction;

the portions are coupled at each one end thereof by a flexible coupling member, wherein the flexible coupling member comprises a wire having ring members fixed at both ends thereof and abutting an outer peripheral surface of each respective portion and fixing bolts with the fixing bolts being passed through the ring members and screwed into internally threaded screw holes which are formed at the ends of the portions, respectively;

the two portions of each of the at least one lock ring are coupled at another ends thereof by another coupling member having a coupling bolt attached in a bolt hole in a lateral face of each of the another ends of the two portions of the lock rings and a collar being disposed around the coupling bolt in a boundary area between the another coupling member and the at least one lock ring, a gap being formed between the another coupling member and a bolt head of the coupling bolt when a tip of the coupling bolt abuts a bottom of the bolt hole; and the flexible coupling member is constructed so as to be able to withstand a tensile force of 2 KN.

5. A multi-piece rim for a vehicle, the multi-piece rim comprising:

a rim base being provided with gutter bands at ends thereof, the gutter bands having at least one groove therein;

at least one lock ring to be fitted in the at least one groove formed in the respective gutter bands;

bead seat bands positioned adjacent the ends of the rim base; and side rings positioned at an inner end and an outer end of the rim base, wherein:

each of the at least one lock ring is divided in two portions in a circumferential direction;

the portions are coupled at each one end thereof by a flexible coupling member, wherein the flexible coupling member comprises a wire having ring members fixed at both ends thereof and abutting an outer peripheral surface of each respective portion and fixing bolts with the fixing bolts being passed through the ring members and screwed into internally threaded screw holes which are formed at the ends of the portions, respectively;

the two portions of each of the at least one lock ring are coupled at another ends thereof by another coupling member having a coupling bolt attached in a bolt hole in a lateral face of each of the another ends of the two portions of the at least one lock ring and a collar being disposed around the coupling bolt in a boundary area between the another coupling member and the lock ring, a gap being formed between the another coupling member and a bolt head of the coupling bolt when a tip of the coupling bolt abuts a bottom of the bolt hole;

the flexible coupling member is constructed so as to be able to withstand a tensile force of 2 KN; and outer surfaces of the another coupling member except for a surface facing to the at least one lock ring are covered with a flexible material.

* * * * *